United States Patent [19]

Rosewarne et al.

[11] Patent Number: 4,616,327

[45] Date of Patent: Oct. 7, 1986

[54] PERSONALIZED GRAPHICS AND TEXT MATERIALS, APPARATUS AND METHOD FOR PRODUCING THE SAME

[75] Inventors: Fenton Rosewarne, Los Angeles; Sean F. O'Donnell, San Francisco, both of Calif.

[73] Assignee: Computer Humor Systems, Pty, Ltd, South Melbourne, Australia

[21] Appl. No.: 570,621

[22] Filed: Jan. 13, 1984

[51] Int. Cl.⁴ .............................................. G06F 15/20
[52] U.S. Cl. .................................... 364/518; 364/400; 364/520
[58] Field of Search ............... 364/518, 519, 520, 521, 364/522, 523, 525, 400; 33/1 K, 23 R, 23 M; 352/50

[56] References Cited

U.S. PATENT DOCUMENTS

| | | | |
|---|---|---|---|
| 4,260,229 | 4/1981 | Bloomstein | 352/50 |
| 4,434,467 | 2/1984 | Scott | 364/518 X |
| 4,435,772 | 3/1984 | Suzuki et al. | 364/520 |
| 4,459,676 | 7/1984 | Oguchi | 364/520 X |
| 4,460,957 | 7/1984 | Eggebrecht et al. | 364/518 X |
| 4,488,244 | 12/1984 | Freeman | 364/525 |
| 4,489,389 | 12/1984 | Beckwith et al. | 364/518 X |
| 4,498,139 | 2/1985 | Malinovsky | 364/518 |
| 4,519,037 | 5/1985 | Brodeur et al. | 364/400 |

Primary Examiner—Edward J. Wise
Attorney, Agent, or Firm—John E. Wagner

[57] ABSTRACT

Apparatus and method for generating and combining for reproduction on a single format, standardized text, standardized graphics, personalized text and personalized graphics. The apparatus employs a computer into which personalized text and personalized graphics information is introduced. A variety of graphics are stored in the computer and compared with the personalized graphics information introduced into the computer. The apparatus combines the standardized text and graphics with the personalized text and graphics to provide a personalized text and graphics output.

28 Claims, 10 Drawing Figures

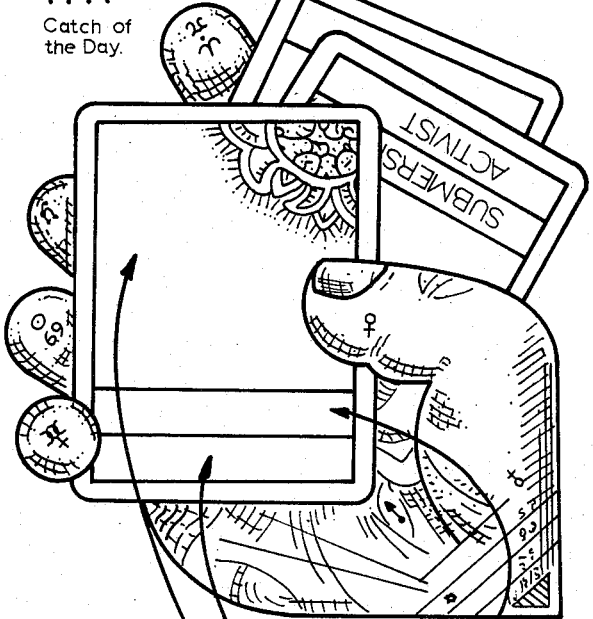
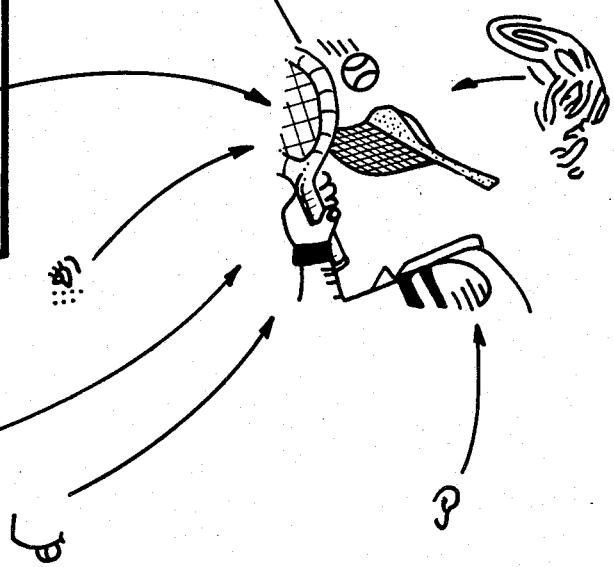
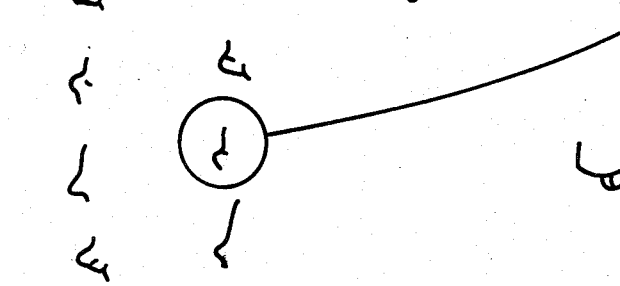

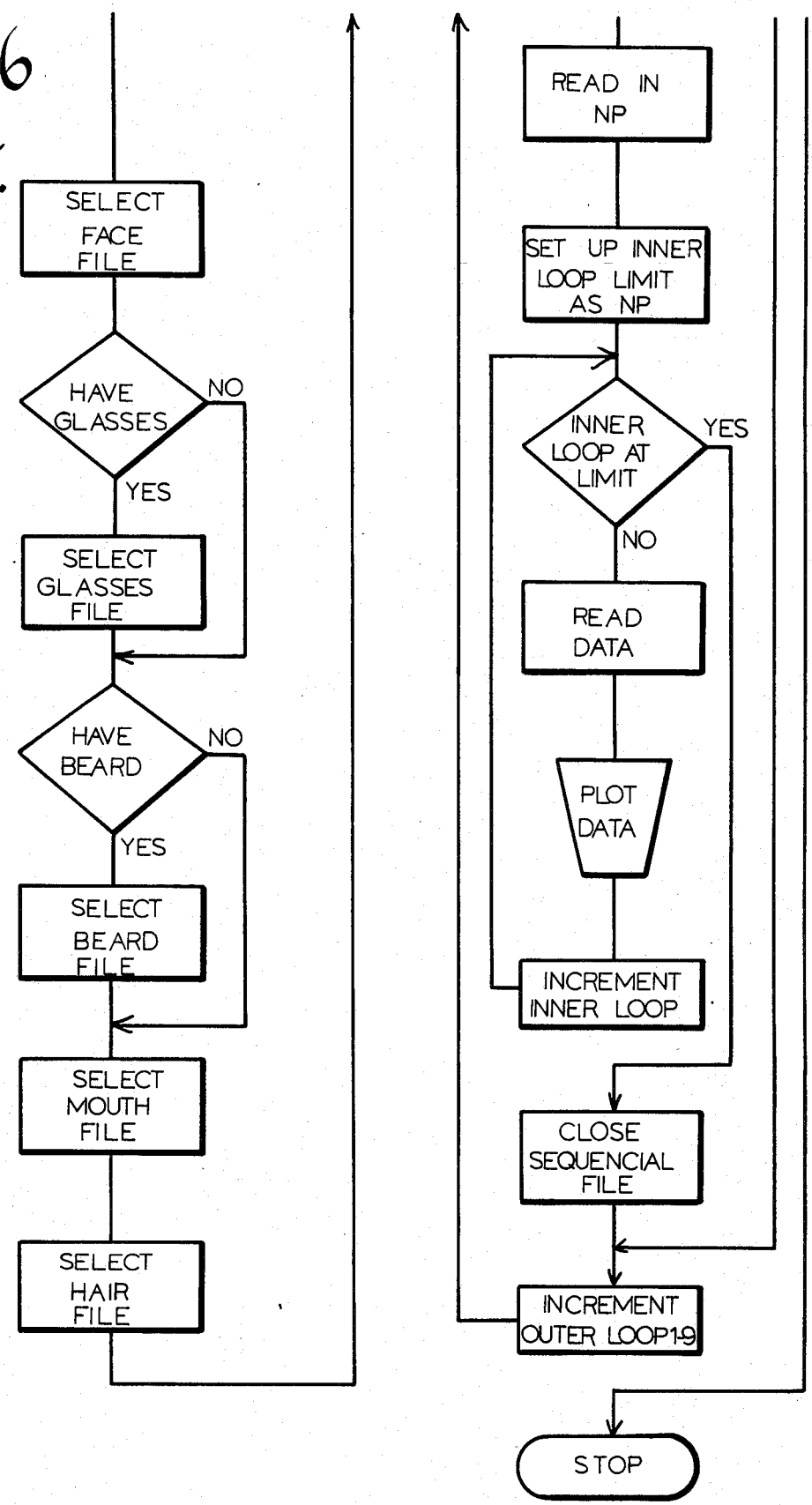

PERSONALIZED GRAPHICS AND TEXT MATERIALS, APPARATUS AND METHOD FOR PRODUCING THE SAME

BACKGROUND OF THE INVENTION

Heretofore, one seeking to present a friend or associate with a greeting card or a poster has the following choices:

(1) If he has sufficient creative and artistic talent, he may take a blank card form or a poster and draw and letter an appropriate message, caricature, pictorial display or whatever is desired; or (2) He can seek out a greeting card or a poster retailer and look through the hundreds of choices of cards, attempting to find one which is appropriate for the occasion, and particularly for the recipient.

Few fall into the first category and can make their own acceptable cards, and those who do truly find their talent appreciated, but most of all a great amount of time is expended in not only the creative but in the artistic aspects of making a card. Such activity is reserved by those who have that ability for very special occasions and persons. Most of us fall into the second category and have noted the frustration in attempting to find an appropriate card.

In the case of children, one type of personalized gift has been developed which is sometimes referred to as the "ME" book. These are picture books for very young children in which the name of the child and perhaps his address or the name of his pet are injected into the text of a book, which is then printed and bound in conventional form. These "ME" books have received a degree of acceptance, however, they are hardly appropriate for adults and because of the high degree of standardization, allow only a few words to be personalized, and have a relatively short term interest for the recipient.

The U.S. Pat. Nos. 3,892,427 and 3,982,744 disclose a process for manufacturing the "ME" type books and illustrate clearly that the insertion of the personalized textual material must be accomplished in the book printing environment. Consequently, "ME" books are usually purchasable from the manufacturer or publisher by mail with a substantial time delay between ordering and receipt.

BRIEF STATEMENT OF THE INVENTION

Faced with this state of the art, we set out to produce documents which are personalized in both the pictorial and textual backgrounds. The apparatus includes means for converting personalized data such as height, build, sex, hair line and the like into control signals for producing a pictorial figure having physical characteristics similar to the personalized data introduced into the system. The apparatus also includes means for introducing personalized text into standard text and for combining this resulting personalized text with the appropriate pictorial background.

We devised a method employing a standard microprocessor which is programmed to provide the storage and combining functions after personalized data is introduced into the system by temporary storage by the purchaser or user on a storage medium such as a punched card.

BRIEF DESCRIPTION OF THE DRAWING

This invention may be more clearly understood from the following detailed description and by reference to the drawing in which:

FIG. 3 is a reproduction of one form of input device, namely a codable card for inputting personalized data;

FIG. 4 is an example of a sports favorite pictorial representation to be controllably inserted into the standardized background under the control of the computer of this invention;

FIG. 5 is an example of personalized text to be inserted into the standardized text of the control in the computer in accordance with this invention;

FIG. 5A is an example of standard text to be personalized;

FIG. 5B is an example of standardized background;

DETAILED DESCRIPTION OF THE INVENTION

Figure 1:
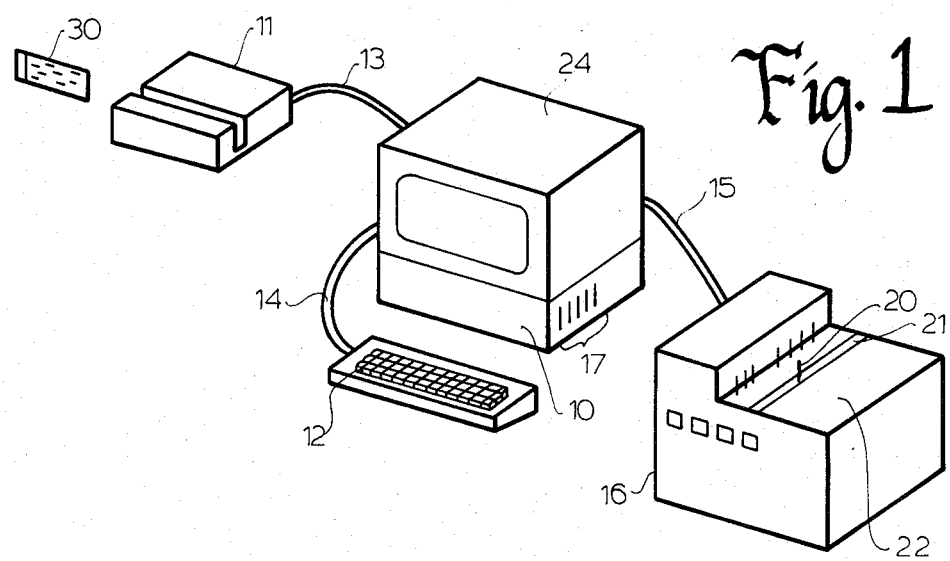
FIG. 1 is a simplified physical layout of a system of this invention.

In contrast to prior systems for producing personalized books, we have determined that it is possible, employing a microprocessor based computer system, to develop a system capable of not only text personalization, but graphic personalization, as well, in producing books, posters, greeting cards and the like. This is accomplished employing the microcomputer system shown in FIG. 1, comprised of basically the microprocessor based computer 10, having two inputs per example from card reader 11 and keyboard 12 via a respective cabling or other links 13 and 14. The computer 10, for example, may be Z80 CPU chip based, and communications may be by RS 232C ports. We have found that the S100 bus system, Model 2200 of California Computer Systems, Inc. of Sunnyvale, Calif. is particularly suited for this use. It affords the flexibility to allow the same basic computer system, by the addition of operating cards, to provide a broad variety of signal processing. This makes it possible to combine personalized text and pictorial information with fixed backgrounds and text. The input device 11 may be a Micro Mark 1 card reader produced by the True Data Corporation of Irvine, Calif. The manual input device keyboard 12 may be any of a number of standard keyboards, but we have found that the Netronics keyboard produced by Netronics R&D, Ltd. is satisfactory for our purpose.

The output of computer 10 over cable 15 is reproduced on plotter 16 which may, for example, by a Bausch & Lombe, Huston Instruments Division, DMP 29 eight pen plotter. The plotter 16 is designed to receive paper up to 11 by 17 inches in size, blank or preprinted, and to move any one of the series of eight pens of different colors from holders, unshown in the drawing, by carrier 21 to positions on the plotting surface 22, to imprint any of eight different colors in patterns as controlled by the computer 10. As here described, the computer system is made up of standard components and becomes specialized on the additional plug-in firmware represented on boards 23 of FIG. 2.

The system of this invention is interactive to guide the operator in the proper inputs to the computer and, as such, uses a monitor 24 which is viewed by the operator while sitting at the keyboard 12. Instructions such as "insert data card" appear on the screen at the beginning of the sequence, and if the data card is correctly read by the card reader 11, a message such as "card data entered" will appear on the screen.

Figure 2:
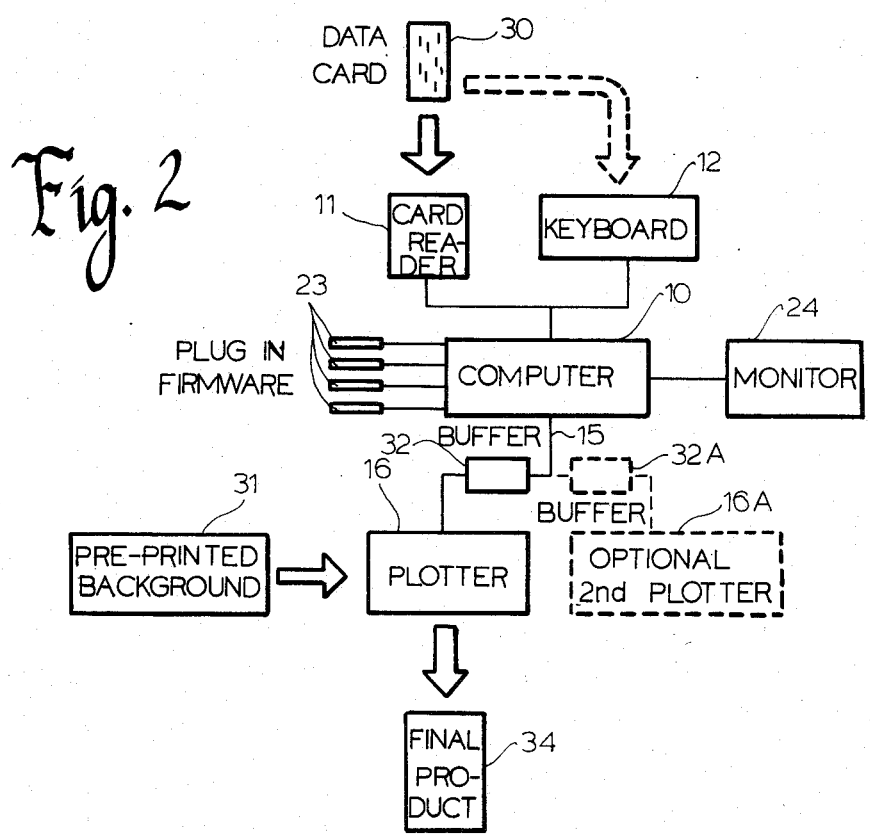
FIG. 2 is a block diagram of the system of FIG. 1.

Now referring to FIGS. 2 and 3, the apparatus of this invention may be more clearly understood and illustrates that the input device, namely card reader 11, is furnished with coded card 30 of the type illustrated in FIG. 4. The user has blackened out appropriate squares as in the case of FIG. 3. He has punched out perforations, in the case of a punched card reader 11. In this case, a reader of the optical type is preferred and used. Data is likewise enterable on the keyboard 12 and therefore, in FIG. 2, the normal direct data source is indicated by the solid arrow with the alternate data source indicated by the dashed arrow. Both the card reader 11 and the keyboard 12 provide personalized data to the computer 10 into which the plurality of firmware cards may be inserted to vary the type of output product produced. The firmware cards are represented in FIG. 1 by the reference numeral 17 but actually are within the computer housing 10, and are associated with the particular preprinted background or backgrounds 31 of the types shown in FIG. 7 which are inserted into the plotter 16 prior to plotting. Note that a buffer 32 is connected between the computer 10 and plotter 16. This buffer has, for example, 64 bytes of memory and is used because the computational speed of the computer 10 is greatly in excess of the speed of plotter 16. The computer 10 is capable of driving more than one plotter on a time share basis and for that reason a second buffer, 32A, indicated in dashed lines, and second or optional plotter, 16A, may be used with the system. The computer 10 may easily drive three plotters. During data input computation and throughout the entire process, the monitor 24 provides information to the operator.

Figure 7:
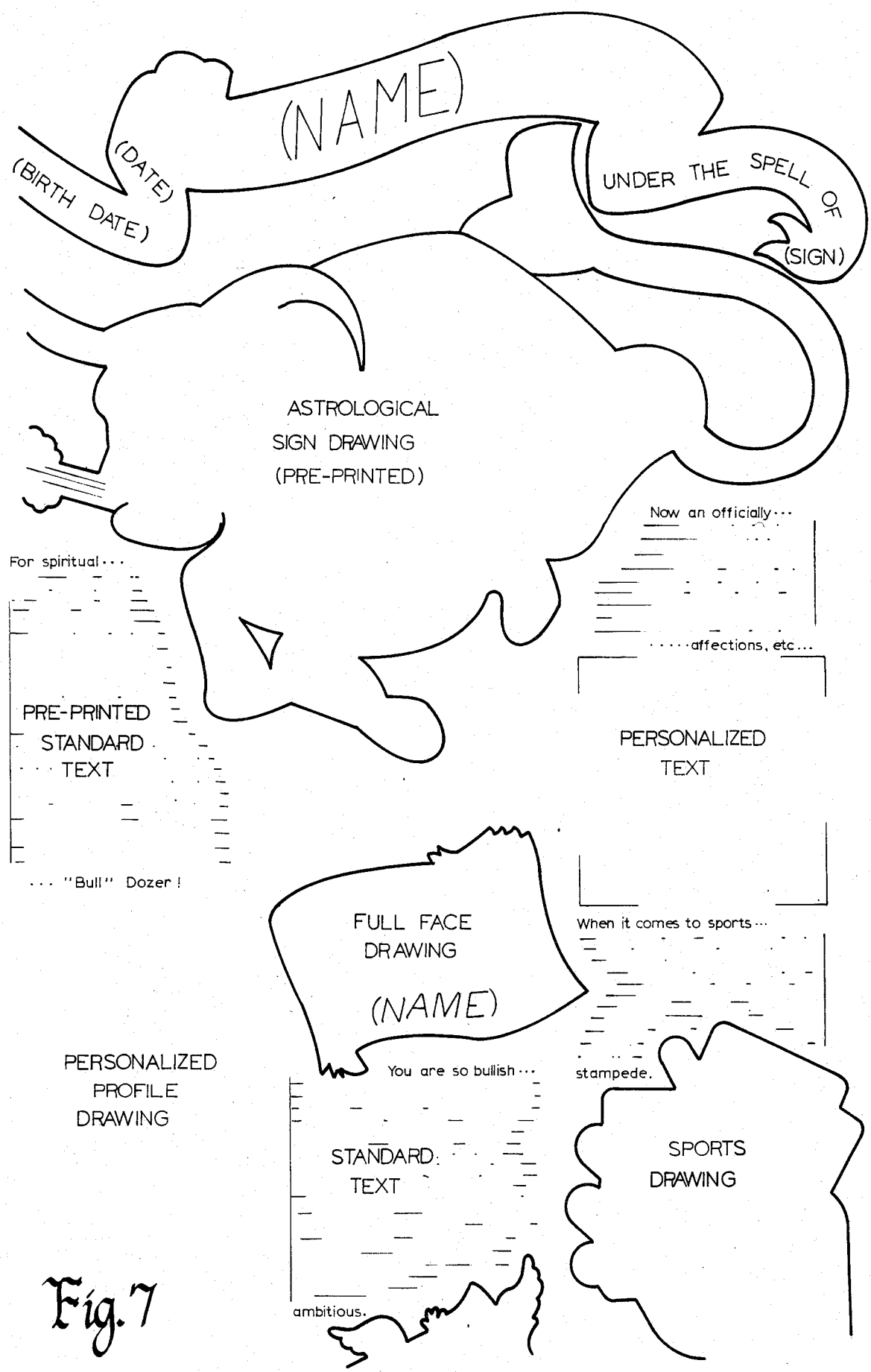
FIG. 7 is an example of an overall layout of standardized text and pictorial background used in carrying out this invention.

When the plotting is finished, the final product 34 is a standard pictorial background interspersed with standard text which is modified by the presence of personalized text and personalized foreground pictorial information. The interrelationship of the standard and personalized information is best illustrated by reference to FIG. 5B. In this figure, a small portion of the preprinted pictorial background of FIG. 7 is shown. The entire document as illustrated in FIG. 7 includes a number of sections, one of which relates to sports and hobbies.

Now referring specifically to FIG. 3, a card 30 is shown in a form which is in part readable by eye and in part optically read by card reader 11 of FIGS. 1 and 2. The card 30 includes lines for introducing the name of the subject of the card as has been done, in this case, SEAN, and other personalized data such as his birthdate are shown entered manually by pen or pencil.

A number of personalized data are entered in the card by blacking out the appropriate choice, the first choice being three age categories; the second category for gender allows, of course, two selections. In this manner, the caricature, which will be printed, bears a certain relationship to the subject, specific enough that the person may be recognizable or at least recognized as represented in caricature. Also, it should be noted that a number of the selections and the general tone of the examples are humorous since this system is most frequently desired to produce a humorous type of poster, card or other form of presentable material but is not so limited.

In addition to the data related to the physical characterstics of the subject, in this particular example, a sport or hobby is selectable. The demonstration and explanation of the operation of the invention is given where the subject or the giver of the presentation has selected each of the characteristics noted by the blackened in boxes on the card 30, and also has selected racquet sports as the sport or hobby of the subject. The optical reader 11 of FIGS. 1 and 2 is designed to scan a card which is inserted in its appropriate opening and register the data positioned aligned with any one of the optical index marks 30A appearing on the left hand margin of card 30. The card reader 11 therefore makes no attempt to read the handwritten name or birthdate or the demonstration block appearing toward the top of the card. The handwritten data is introduced into the computer 10 of FIGS. 1 and 2 via keyboard 12.

Stored in the memory of the computer 10, particularly in the firmware 17, are directions to the plotter to plot a large number of physical characteristic shapes which are associated with the selections made on card 30. As an example, in the case of noses, twelve different noses of various sizes and shapes, have been stored including directions for their location in the pictorial printout. These noses appear as a part of FIG. 4 below the card 30. In this case, card 30 has been marked with a small nose of a male under 18 and the equivalent of Caucasion. Those criteria along with the particular sport selected, in this case, racquet sports, denote that the encircled nose is appropriate. Similar selections are made for eye, mouth, chin and ear from stored pictorial data. The hair, denoted by the reference 76, has been selected on the basis of the sex, age, type, length and color of hair as well as the sport.

As is apparent in FIG. 4, a partial figure holding a racquet, wearing a visor, in appropriate attire and about to be struck by a ball, has likewise been stored. The stored partial figure is selected on the basis of the sport selected as well as sex and in certain cases, age.

The size and shape of the partial figure and the blank areas left are selected and determined in order that each of the components making up a caricature, in this case the hair, eye, nose, mouth, chin and ear, all fit within the appropriate open space to complete the partial figure of a racquetball player. Likewise, the outline shape of the racquet player, when completed, is of appropriate size and shape to fill a blank area in a part of the background graphics of the final document to be delivered. In this case, a stylized hand is shown in FIG. 5A holding some playing cards with the nearest playing card having a space. Below the space for the caricature are other spaces available to take the subject's name and a personalized statement, related in this case, to the sport selected. In the example given, the subject's name, SEAN, along with the expression, "THE WILD RACQUETEER", are inserted below his caricature.

FIG. 5 in combination with FIG. 5A show the integration of personalized text into standardized text. In this case, the personalized text is the subject's name, SEAN, and the statement, "AT PLAY". Also appropriate but not required in this particular text is the substitution of gender terms such as "his" or "hers" based upon the selection of gender made on card 30. When completed, the document, which may be a poster, card, booklet or the like, includes the standardized text shown in FIG. 5A, the personalized text illustrated in FIG. 5, the background graphics shown in FIG. 5A, and the foreground, personalized graphics or pictorial display of FIG. 4. The source of the personalized information is the card 30 with most of the information introduced into the computer by the card reader 11, but the actual spelling of the name and birthdate are introduced by the keyboard 12.

Figure 6:
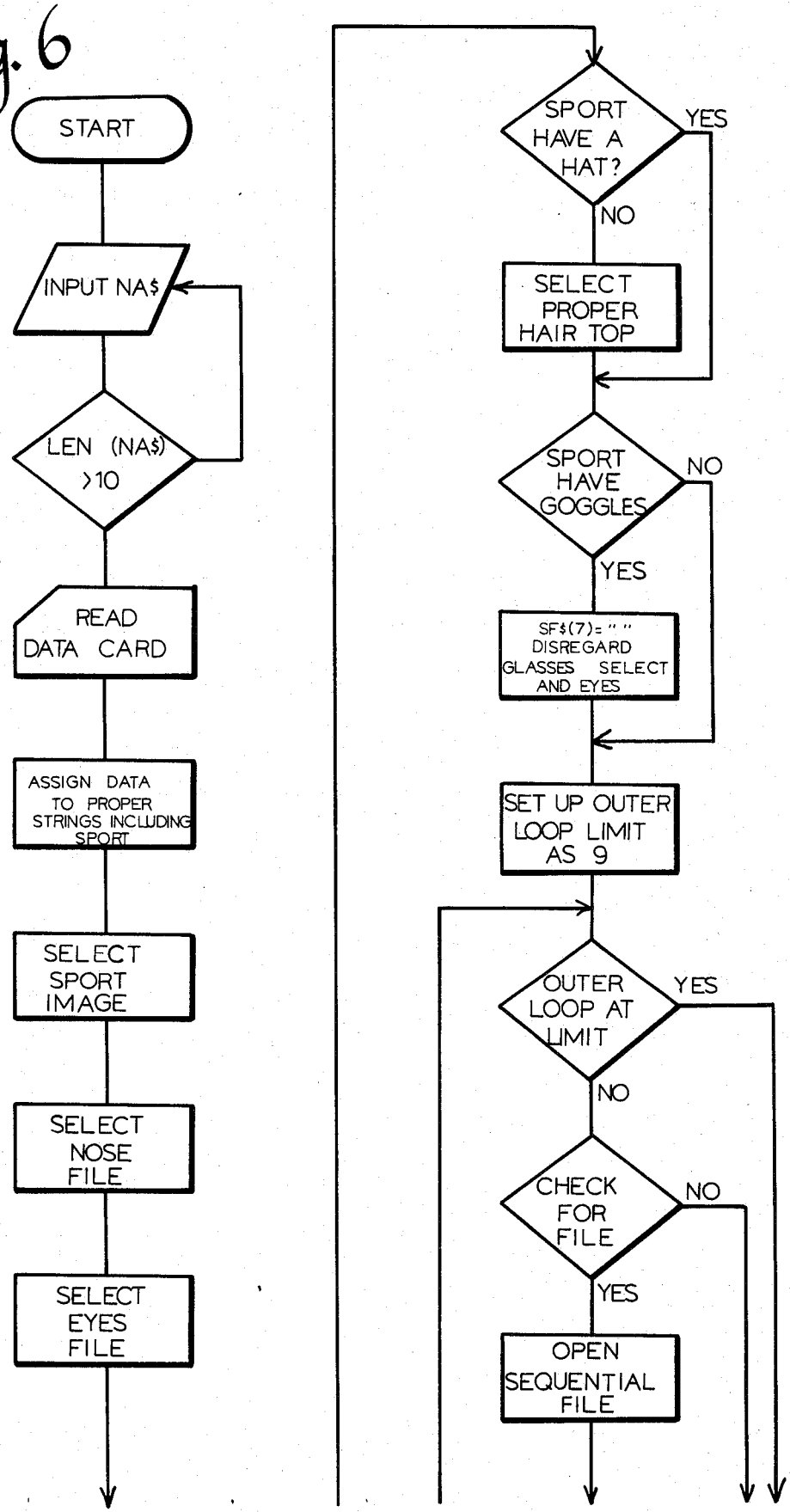
FIG. 6 and 6 cont. is a flow diagram of the computer operation of this invention.
Figure 6A:
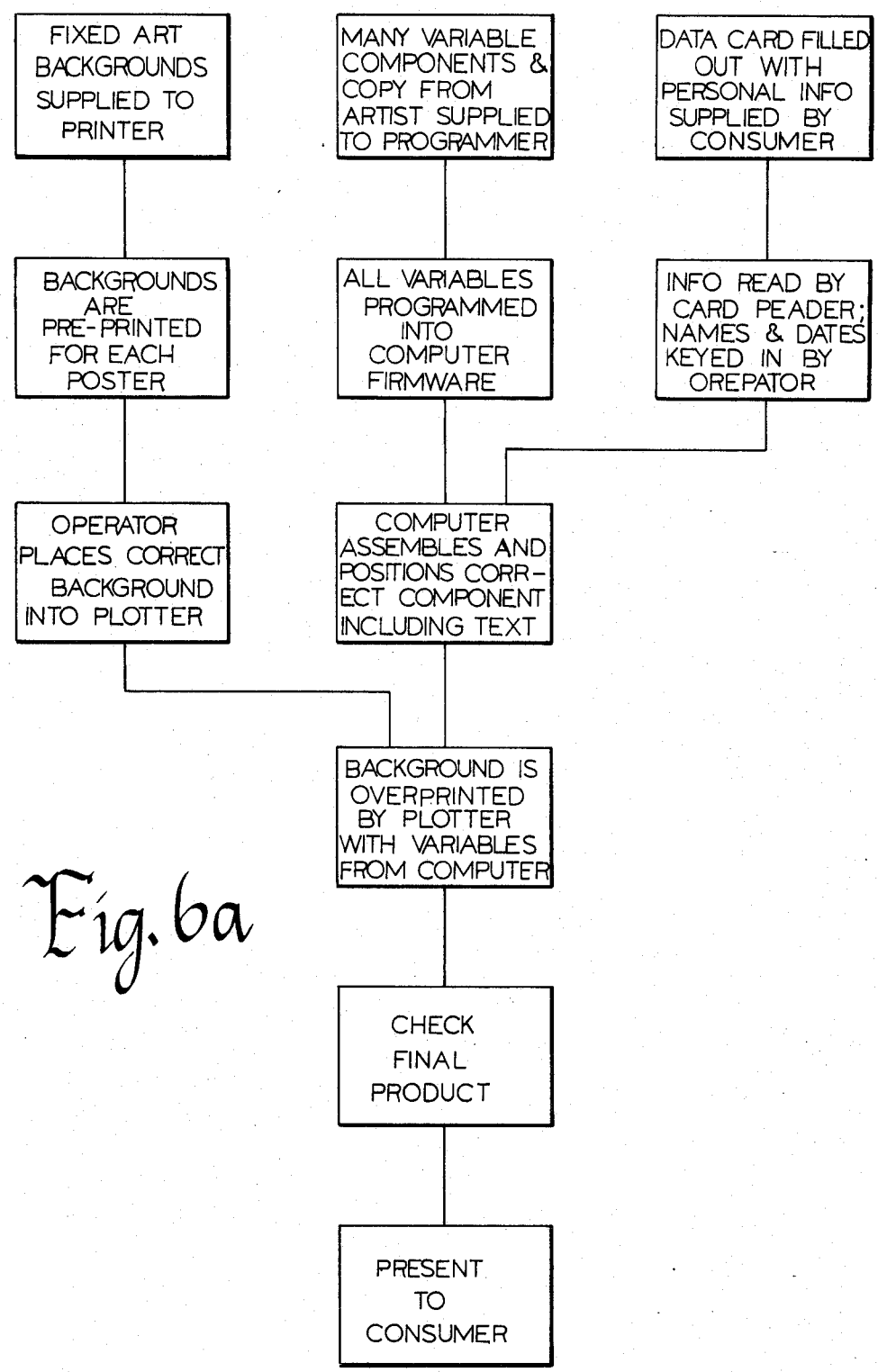
FIG. 6A is a flow diagram of the entire process of this invention.

The complete process from beginning to end is illustrated in FIG. 6 including the preparation of the background material, which is actually printed in a conventional printing manner in multiple color presses. An inventory of the backgrounds is maintained by the operator of the system and the appropriate background is inserted into the plotter on its surface 22 where a personalized poster can be made.

All of the various foreground personalized variables are drawn and furnished to a programmer to develop the program to control the selection and direction of the plotter 22 to produce the selected personalized pictorial material at the appropriate place on the background. This is done by developing the program and introducing it into firmware for the computer 10.

At the point of manufacture of the end product, which usually corresponds to the point of sale, the personalized data is introduced onto the card 30 and certain personalized data is introduced by the keyboard operator at the time the personalized data is read from the card 30.

The computer 10 stores the personalized data and personalized pictorial information as well as the standard text which is printed in addition to that text which may be on the preprinted background. The computer 10 combines each of these inputs to develop control signals to the plotter 16 as to position, color, graphics to be plotted, order of operations and conveys its commands to the plotter 16, which then proceeds to make the completed plot.

In the example given in FIGS. 4, 5 and 5A, a portion of a larger poster as illustrated in FIG. 7 will be plotted with the name, SEAN, appropriately inserted into the text. The sport quotation, "AT PLAY" is inserted into the text and the selection of variable facial characteristics, hair style and sport will be combined and printed in the background space of FIG. 5A. The titling of the caricature is accomplished under the control of the computer by insertion in the title line of FIG. 5A the subject's name and a characterization of the sport, in this case, "WILD RACQUETEER".

As final steps in the manufacture, the operator inspects the final product to make certain that proper registration has occurred between the pre-printed material and the newly added graphics and text, and that the caricature and comments are reasonable. Thereafter, the computer 10 and plotter 16 are free to proceed with the next plot. The cards 30, already made, may be retained to make duplicates or be returned to the customer.

The computational steps as well as the control and storage steps in the computer 10 are accomplished under the control of a program written, in this case, in Microsoft basic 80 language available from the Microsoft Corp. of Bellevue, Wash. and represented by the listing accompanying this application. The listing covers the steps for producing the sports caricature as described above and of course the full program for making multiple caricatures will be longer but constitute basically redundant operations to those illustrated herein.

The program which accompanies this dislcosure includes statements 10 through 15420 in Microsoft Basic 80 language. The steps carried out by the computer 10 under the control of the program, reads the data card, stores the data, makes the required selections, correlates the data to select appropriate images and causes the plotter to print the personalized text and to draw the personalized pictorial images. The subject's name is printed on a banner along with his birth date. In the example given, the background is selected on the basis of the subject's astrological sign for the particular humorous example here disclosed. Other formats may be used.

The steps in the program are basically as follows:

| STEPS | FUNCTION |
|---|---|
| 10–430 | TITLE BLOCK |
| 440 | ALLOCATING MEM |
| 450–460 | INIT. DATE VAR. |
| 470 | TEXT SIZE SELEC |
| 490–640 | INPUTTING DATA |
| 650–940 | ASTROL. SIGN SEL. |
| 950–1010 | DATA VERIFY |
| 1030–1770 | CARD DATA CHECK |
| 1780–1840 | ASSGN. CKG. VAR. |
| 1850 | INIT. CAP. ONLY |
| 1860–4400 | TEXT POSIT. BASED ON ASTROL. SIGN SELECTION |
| 4410–4450 | MEM. SVD & LINKED TO NEXT PGM |
| 4480–5010 | SELECT NOSE |
| 5030–5200 | SELECT EYES |
| 5220–5750 | SELECT FACE |
| 5770 | OMIT GLASSES |
| 5790–5960 | GLASSES SELECT |
| 5980 | OMIT BEARD |
| 6000–6350 | BEARD SELECT |
| 6360–6380 | PROFILE FEATURES SELECT |
| 6390–6430 | MEM. SVD & LINKED TO NEXT PGM |
| 6460–9330 | SELECT HAIR STYLE |
| 9340–9380 | MEM. SVD & LINKED TO NEXT PGM |
| 9410–12289 | SEL. ALT. HAIR STYLE |
| 12290–12330 | MEM. SVD & LINKED TO NEXT PGM |
| 12360–12570 | GEN FILE NAMES |
| 12590–12600 | PLOT BIRTH DATE |
| 12610–12630 | SET BANNER POSIT. |
| 12660–13390 | PLOT NAME ON BANNER |
| 13940 | ROTATE CHARACTER |
| 13950–14140 | BANNER POSITION DATE |
| 14160–14340 | HAIR SEL. IF NO SPORTS HAT |
| 14370–14430 | PLOT PERSONALIZED TEXT |
| 14440–14560 | PLOT PROFILE |
| 14580–14690 | PLOT BANKNOTE FRONT FACIAL |
| 14710–14910 | PLOT PERSONALIZED TEXT |
| 14930–15050 | PLOT SPORT |
| 15060–15410 | PLOT PERSONALIZED TEXT |
| 15420 | RETURN |

The operation of the computer 10 under the control of the program as listed and accompanying this application is illustrated in the flow chart of FIG. 6. The listing includes the initial steps of selecting the background based upon the subject's birthdate and the length of the subject's name for purposes of spacing the name on the final product. The steps thereafter relate to the processing to select appropriate facial characteristics, and sport or hobby for the personalized pictorial portions of the end product.

The steps of the process include the reading of the data card and storing the data read in the various files as strings. Next, the series of select functions from the stored permanent features occurs. The select functions depend upon the data of the particular subject, e.g. male vs female, under 18 vs older subjects, race or ethnic group and hair quantity and style as well as sex. Whether the subject wears glasses or not is selected as is his bearded or non bearded status. The sport or hobby selected on the card 30 is selected and the presence or absence of goggles is determined for that sport. If the subject wears goggles according to the sport selected, the presence of glasses is ignored.

In performing the select functions from the stored pictorial data, the following data inputs are used in each respective selection.

| SELECT STEP | | | | DATA |
|---|---|---|---|---|
| Select sport | | sex | | sport |
| Select nose | age | sex | race | size |
| Select eyes | age | sex | race | color |
| Select face | age | sex | race | build |
| Select glasses | age | sex | race | sport |
| Select beard | age | sex | race | hair color style |
| Select mouth | age | sex | race | sport |
| Select hair | age | sex | race | hair color amount type sport |

After the selection steps are completed, with less than 9 selections, the sequential files are opened and thereafter the data in the files is read in sequence and plotted. After each file is incrementally read and plotted the files are closed and the sequence stops. The document is completed.

Characteristic of this invention is the fact that a variety of physical characteristics of the subject are stored along with personal data such as their favorite sport and their name and birthdate. The various inputs are combined to produce a caricature and combine information as appropriate into the text whereby the end product in both words and picture assume a personalized nature for the recipient. The detailed nature of the caricature is such that it can allow the recipient continuing interest and amusement, much more than merely the presence of his name in text, which is also achieved by this invention.

The foregoing embodiments are merely illustrative of this invention and are not to be considered as restrictive. It is recognized that one skilled in the art may make modifications of an invention without departing from the spirit and concept of the invention. Therefore my invention is instead defined by the following claims and their equivalents.

```
10  REM     PROGRAM "HUMOR" IS THE STARTING PROGRAM
20  REM     IN A SERIES OF CHAINED PROGRAMS.
30  PRINT CHR$(26);
40  IF NE=1 THEN 460
50  PRINT " _____     _____       "
60  PRINT "|                |   |                |    "
70  PRINT "|                |   |                |    "
80  PRINT "|     CCCCC      |   |     PPPPP      |    "
90  PRINT "|     C          |   |     P    P     |    "
100 PRINT "|     C          |   |     PPPPP      |    "
110 PRINT "|     C          |   |     P          |    "
120 PRINT "|     CCCCC      |   |     P          |    "
130 PRINT "|                |   |                |    "
140 PRINT " _____     _____     "
150 PRINT
160 PRINT Z1$:PRINT:PRINT Z2$:PRINT:PRINT Z3$:PRINT Z4$:PRINT Z5$
170 PRINT:PRINT Z6$:PRINT Z7$:PRINT Z8$:PRINT Z9$
180 Z1$="COPYRIGHT COMPUTER HUMOR SYSTEMS, INC. 1983."
190 PRINT
200 Z2$="ALL RIGHTS RESERVED INTERNATIONAL COPYRIGHT SECURED."
210 PRINT
220 Z3$="POSSESSION OF THIS PROGRAM DOES NOT CONVEY ANY RIGHT TO"
230 Z4$="REPRODUCE, USE OR SELL THIS PROGRAM OR THE INFORMATION"
240 Z5$="CONTAINED THEREIN."
250 PRINT
260 Z6$="THE RECIPIENT IS HEREBY WARNED THAT UNAUTHORIZED REPRODUCTION"
270 Z7$="OR THE USE OF THIS PROGRAM IS SUBJECT TO BOTH CIVIL AND CRIMINAL"
280 Z8$="PENALTIES UNDER THE UNITED STATES COPYRIGHT LAWS AND THE LAWS"
290 Z9$="OF MANY STATES AND COUNTRIES."
300 REM   CARD SUBRUTINE FOR MAIN PROGRAM
310 DEFINT A-Z
320 PRINT "INSERT A BLANK SHEET OF PAPER INTO THE PLOTTER"
330 LINE INPUT "THEN HIT THE RETURN KEY WHEN READY";AN$
340 LPRINT ";:H A"
350 SIZE2$="100 50 S(S5,W3,X-1,Y 99)":LPRINT Z1$;TE$;"U P2"
360 LPRINT SIZE2$;Z2$;TE$;"U P3"
370 LPRINT SIZE2$;Z3$;TE$;"U P4"
380 LPRINT SIZE2$;Z4$;TE$;"U P5"
390 LPRINT SIZE2$;Z5$;TE$;"U P6"
400 LPRINT SIZE2$;Z6$;TE$;"U P7"
410 LPRINT SIZE2$;Z7$;TE$;"U P1"
420 LPRINT SIZE2$;Z8$;TE$;"U P2"
430 LPRINT SIZE2$;Z9$;TE$;"U P1"
440 DIM D(80),T$(20)
```

```
450 MO$=" ":DA$=" ":DATE$="        "
460 INPUT "ENTER NAME ";NA$
470 SIZE1$="S(S3,W2,X-1,Y 99)":SIZE2$="S(S5,W3,X-1,Y 99)":TE$=CHR$(95)
480 IF LEN(NA$))10 THEN PRINT "NAME TO LONG ":GOTO 460
490 INPUT "ENTER MO ";MO$:IF LEN(MO$)<2 THEN MID$(DATE$,1,2)="0"+MO$:GOTO 510
500 MID$(DATE$,1,2)=MO$
510 IF VAL(MO$)=0 THEN 550
520 FOR I=1 TO 12:READ MN$,M,X,Y:IF VAL(MO$)=M THEN MON$=MN$:X1=X:Y1=Y
530 NEXT I
540 GOTO 580
550 FOR I=1 TO 12:READ MN$,M,X,Y
560 IF MID$(MO$,1,3)=MID$(MN$,1,3) THEN MON$=MN$:X1=X:Y1=Y
570 NEXT I
580 INPUT "ENTER DA ";DA$:IF LEN(DA$)<2 THEN MID$(DATE$,3,2)="0"+MO$:GOTO 600
590 MID$(DATE$,3,2)=DA$
600 BD=VAL(DATE$)
610 INPUT "ENTER YEAR ";YE:IF YE<100 THEN YE=YE+1900
620 DATA JANUARY,1,410,170,FEBUARY,2,400,150,MARCH,3,410,175,APRIL,4,410,175
630 DATA MAY,5,450,230,JUNE,6,425,190,JULY,7,425,190,AUGEST,8,410,170
640 DATA SEPTEMBER,9,380,130,OCTOBER,10,410,170,NOVEMBER,11,400,150,DECEMBER,12,
400,150
650 GOTO 700
660 PRINT "ENTER THERE SIGN  1=";SI1$;"  2=";SI2$
670 SIGN$=SI1$:INPUT SCH:IF SCH=2 THEN S=S+1:SIGN$=SI2$
680 IF S>12 THEN S=1
690 GOTO 1030
700 IF BD>119 AND BD<122 THEN SI1$="CAPRICORN":SI2$="AQUARIUS":S=1:GOTO 660
710 IF BD>218 AND BD<221 THEN SI1$="AQUARIUS":SI2$="PISCES":S=2:GOTO 660
720 IF BD>319 AND BD<322 THEN SI1$="PISCES":SI2$="ARIES":S=3:GOTO 660
730 IF BD>419 AND BD<422 THEN SI1$="ARIES":SI2$="TAURUS":S=4:GOTO 660
740 IF BD>519 AND BD<522 THEN SI1$="TAURUS":SI2$="GEMINI":S=5:GOTO 660
750 IF BD>620 AND BD<623 THEN SI1$="GEMINI":SI2$="CANCER":S=6:GOTO 660
760 IF BD>721 AND BD<724 THEN SI1$="CANCER":SI2$="LEO":S=7:GOTO 660
770 IF BD>822 AND BD<825 THEN SI1$="LEO":SI2$="VIRGO":S=8:GOTO 660
780 IF BD>922 AND BD<925 THEN SI1$="VIRGO":SI2$="LIBRA":S=9:GOTO 660
790 IF BD>1022 AND BD<1025 THEN SI1$="LIBRA":SI2$="SCORPIO":S=10:GOTO 660
800 IF BD>1121 AND BD<1124 THEN SI1$="SCORPIO":SI2$="SAGITTARIUS":S=11:GOTO 660
810 IF BD>1220 AND BD<1223 THEN SI1$="SAGITTARIUS":SI2$="CAPRICORN":S=12:GOTO 660
820 IF BD>100 AND BD<120 THEN SIGN$="CAPRICORN":S=1
830 IF BD>121 AND BD<219 THEN SIGN$="AQUARIUS":S=2
840 IF BD>220 AND BD<320 THEN SIGN$="PISCES":S=3
850 IF BD>321 AND BD<420 THEN SIGN$="ARIES":S=4
860 IF BD>421 AND BD<520 THEN SIGN$="TAURUS":S=5
870 IF BD>521 AND BD<621 THEN SIGN$="GEMINI":S=6
880 IF BD>622 AND BD<722 THEN SIGN$="CANCER":S=7
890 IF BD>723 AND BD<823 THEN SIGN$="LEO":S=8
900 IF BD>824 AND BD<923 THEN SIGN$="VIRGO":S=9
910 IF BD>924 AND BD<1023 THEN SIGN$="LIBRA":S=10
920 IF BD>1024 AND BD<1122 THEN SIGN$="SCORPIO":S=11
930 IF BD>1123 AND BD<1221 THEN SIGN$="SAGITTARIUS":S=12
940 IF BD>1222 AND BD<1232 THEN SIGN$="CAPRICORN":S=1
950 PRINT "NAME:   ";NA$
960 PRINT "SIGN:   ";SIGN$
970 PRINT "MONTH: ";MON$;"    ";M
980 PRINT "DAY:    ";DA$
990 PRINT "YEAR:   ";YE
1000 INPUT "CORRECT    Y/N ";AN$:IF AN$="Y" THEN 1030
1010 IF AN$="y" THEN 1030
1020 GOTO 460
1030 P1=9248:P2=10272:P3=12320:P4=16416:P5=8225:P6=8226:P7=8228:P8=8232:P9=8256
1040 CALL RCARD (D(1), D)
1050 REM   CHECK FOR AGE
1060 IF D(1)=P3 THEN A$="C"
1070 IF D(1)=P6 THEN A$="T"
1080 IF D(1)=P9 THEN A$="A"
1090 REM CHECK FOR SEX
1100 IF D(2)=P3 THEN B$="M"
1110 IF D(2)=P6 THEN B$="F"
1120 REM          CHECK FOR RACE
1130 IF D(3)=P1 THEN C$="B"
```

```
1140 IF D(3)=P4 THEN C$="W":CC$="M"
1150 IF D(3)=P7 THEN C$="O"
1160 IF D(3)=P9 THEN C$="W"
1170 REM CHECK FOR HAIR TYPE
1180 IF D(4)=P2 THEN D$="BD"
1190 IF D(4)=P6 THEN D$="BG"
1200 IF D(4)=P9 THEN D$="CR"
1210 IF D(5)=P2 THEN D$="SS"
1220 IF D(5)=P6 THEN D$="ME"
1230 IF D(5)=P9 THEN D$="LL"
1240 REM         CHECK FOR HAIR COLOR
1250 IF D(6)=P6 THEN E$="D"
1260 IF D(6)=P9 THEN E$="L"
1270 REM         CHECK FOR HAIR STYLE
1280 IF D(7)=P3 THEN F$="WV"
1290 IF D(7)=P6 THEN F$="CY"
1300 IF D(7)=P9 THEN F$="WB"
1310 IF D(8)=P3 THEN F$="FZ"
1320 IF D(8)=P6 THEN F$="AF"
1330 IF D(8)=P9 THEN F$="ST"
1340 REM         CHECK FOR BEARD OR MUSTACHE
1350 IF D(9)=P9 THEN G$="NN":GOTO 1400
1360 IF D(10)=P2 THEN G$="GG"
1370 IF D(10)=P6 THEN G$="MS"
1380 IF D(10)=P9 THEN G$="FB"
1390 REM         CHECK FOR SIZE OF NOSE
1400 IF D(11)=P4 THEN H$="LG"
1410 IF D(11)=P7 THEN H$="MD"
1420 IF D(11)=P9 THEN H$="SM"
1430 REM         CHECK FOR GLASES
1440 IF D(12)=P6 THEN I$="Y"
1450 IF D(12)=P8 THEN I$="N"
1460 REM         CHECK FOR SIZE OF PERSON
1470 IF D(13)=P5 THEN J$="TH"
1480 IF D(13)=P9 THEN J$="AV"
1490 IF D(14)=P5 THEN J$="FA"
1500 IF D(14)=P9 THEN J$="AV"
1510 REM         CHECK FOR TYPE OF SPORT
1520 IF D(15)=P1 THEN SP1$="CHANNEL":SP2$="CHANGER":SC1$="VIDEO VOYEUR":SP=1:SF$(8)="SM4":SF$(0)="SO14"
1530 IF D(15)=P6 THEN SP1$="WET":SP2$="DREAMS":SC1$="POOL SHARK":SP=2:SF$(8)="SM2":SF$(0)="SO2":G=1
1540 IF D(2)=P6 THEN SC1$="WAVE MAKER":SF$(8)="SO3":G=1:H=1
1550 IF D(15)=P9 THEN SP1$="BIBLIO-":SP2$="MANIA":SC1$="POCKETBOOK PEEKER":SP=3:SF$(8)="SM6":SF$(0)="SO23"
1560 IF D(16)=P1 THEN SP1$="PERFECT":SP2$="PITCH":SC1$="BEAT PICKER":SP=4:SF$(8)="SM6":SF$(0)="SO22":H=1
1570 IF D(16)=P6 THEN SP1$="MUSCLE":SP2$="BOUND":SC1$="WEIGHT WATCHER":SP=5:SF$(8)="SM1":SF$(0)="SO9"
1580 IF D(16)=P9 THEN SP1$="TRAINING":SP2$="WHEELS":SC1$="PEDAL PUSHER":SP=6:SF$(8)="SM2":SF$(0)="SO5":H=1
1590 IF D(17)=P1 THEN SP1$="HOLE":SP2$="IN ONE":SC1$="RECKLESS DRIVER":SP=7:SF$(8)="SM5":SF$(0)="SO11":H=1
1600 IF D(17)=P6 THEN SP1$="HEAVY":SP2$="HANDED":SC1$="KICK STARTER":SP=8:SF$(8)="SM3":SF$(0)="SO6"
1610 IF D(17)=P9 THEN SP1$="GUTTER":SP2$="THOUGHTS":SC1$="HIGH ROLLER":SP=9:SF$(8)="SM5":SF$(0)="SO15"
1620 IF D(18)=P1 THEN SP1$="BLIZZARD":SP2$="AREA":SC1$="HOT DOGGER":SP=10:SF$(8)="SM5":SF$(0)="SO10":G=1:H=1
1630 IF D(18)=P6 THEN SP1$="COMPOST":SP2$="HEAP":SC1$="SEEDY CHARACTER":SP=11:SF$(8)="SM3":SF$(0)="SO16":H=1
1640 IF D(2)=P6 THEN SC1$="PANSY PUSHER":SF$(0)="SO17":H=1
1650 IF D(18)=P9 THEN SP1$="OFF THE":SP2$="TRACK":SC1$="SNEAKER STREAKER":SP=12:SF$(8)="SM2":SF$(0)="SO19"
1660 IF D(19)=P1 THEN SP1$="WANDER-":SP2$="LUST":SC1$="JAUNTY JET SETTER":SP=13:SF$(8)="SM5":SF$(0)="SO21":G=1:H=1
1670 IF D(19)=P6 THEN SP1$="OUT OF":SP2$="BOUNDS":SC1$="BENCH WARMER":SP=14:SF$(8)="SM5":SF$(0)="SO26":H=1
1680 IF D(19)=P9 THEN SP1$="PARTY":SP2$="GAMES":SC1$="SOCIAL WHIRLER":SP=15:SF$(8)="SM4":SF$(0)="SO24":H=1
1690 IF D(20)=P1 THEN SP1$="SOMETHING":SP2$="FISHY":SC1$="WORM WRANGLER":SP=16:S
```

```
F$(8)="SM1":SF$(0)="S04":H=1
1700 IF D(20)=P6 THEN SP1$="SORE":SP2$="FEET":SC1$="WILD GOOSE CHASER":SP=17:SF$
(8)="SM1":SF$(0)="S012":H=1
1710 IF D(20)=P9 THEN SP1$="SKETCHY":SP2$="FACTS":SC1$="CRAFTY DEVIL":SP=18:SF$(
8)="SM6":SF$(0)="S028":H=1
1720 IF D(21)=P1 THEN SP1$="DEAD":SP2$="RECKONING":SC1$="DINGY ADMIRAL":SP=19:SF
$(8)="SM5":SF$(0)="S020":H=1
1730 IF D(21)=P6 THEN SP1$="STACKED":SP2$="DECK":SC1$="DICEY DEALER":SP=20:SF$(8
)="SM6":SF$(0)="S013":G=1
1740 IF D(21)=P9 THEN SP1$="TWO LEFT":SP2$="FEET":SC1$="FANCY FOOTWORKER":SP=21:
SF$(8)="SM4":SF$(0)="S07"
1750 IF D(22)=P1 THEN SP1$="HORSE":SP2$="SENSE":SC1$="SADDLE TRAMP":SP=22:SF$(8)
="SM1":SF$(0)="S025":G=1:H=1
1760 IF D(22)=P6 THEN SP1$="HIGH":SP2$="STRUNG":SC1$="WILD RACKETEER":SP=23:SF$(
8)="SM1":SF$(0)="S01":G=1
1770 IF D(22)=P9 THEN SP1$="GENIUS":SP2$="WETWARE":SC1$="JOY STICK JIGGLER":SP=2
4:SF$(8)="SM4":SF$(0)="S018"
1780 IF B$="F" THEN SF$(8)=""
1790 IF A$="A" AND B$="M" AND C$="B" THEN SF$(8)=""
1800 NO$=A$+B$+C$+H$:FA$=A$+B$+C$+J$:EY$=A$+B$+C$
1810 HA$=A$+B$+C$+E$+F$+D$:IF A$="T" THEN HA$="A"+B$+C$+E$+F$+D$
1820 IF C$="W" THEN HA$=A$+B$+"O"+E$+F$+D$
1830 IF A$="T" AND C$="W" THEN HA$="A"+B$+"O"+E$+F$+D$
1840 BE$=A$+B$+C$+E$+G$:GL$=A$+B$+C$:NAM$=NA$
1850 FOR I=2 TO LEN(NA$):NZ$=MID$(NA$,I,1):NX=ASC(NZ$)+32:NX$=CHR$(NX):MID$(NAM$
,I,1)=NX$:NEXT I
1860 REM
1870 REM **   THE INNER NAME **
1880 T$(1)="1430 2 "+SIZE2$+"THE"
1890 REM   **   SMALL NAME   IN PROFILE   **
1900 T$(2)="2440 100 S(S3,W2,X-44,Y 90)"+NA$+"'S"+TE$
1910 REM **   HOBBY ZONE   ***
1920 TX$="2630":TY$=STR$(324+((INT((9-LEN(SP1$))/2))*12))
1930 TN$=TX$+TY$+" "+SIZE1$+SP1$
1940 T$(19)=TN$+TE$
1950 TX$="2650":TY$=STR$(310+((INT((9-LEN(SP2$))/2))*12))
1960 TN$=TX$+TY$+" "+SIZE1$+SP2$
1970 T$(20)=TN$+TE$
1980 REM YEAR
1990 T$(14)="310 310 S(S6,W4,X 76,Y 64)1"+TE$
2000 T$(15)="335 325 S(S7,W4,X 76,Y 64)9"+TE$
2010 TX=VAL(YEAR$)-1900:TX$=STR$(TX)
2020 T$(16)="360 348 S(S8,W4,X 76,Y 64) "+TX$+TE$
2030 T$(17)="500 340 S(S8,W4,X 61,Y 98)"+DA$+TE$
2040 T$(19)=STR$(X1)+STR$(Y1)+" S(S8,W4,X 63,Y 76)BORN "+MON$+TE$
2050 IF VAL(DA$)=1 THEN 2090
2060 IF VAL(DA$)=21 THEN 2090
2070 IF VAL(DA$)=31 THEN 2090
2080 GOTO 2100
2090 T$(18)="520 410 S(S8,W4,X 7,Y 99)st. "+TE$:GOTO 2220
2100 IF VAL(DA$)=2 THEN 2130
2110 IF VAL(DA$)=22 THEN 2130
2120 GOTO 2140
2130 T$(18)="520 410 S(S8,W4,X 7,Y 99)nd. "+TE$:GOTO 2220
2140 IF VAL(DA$)=3 THEN 2170
2150 IF VAL(DA$)=33 THEN 2170
2160 GOTO 2180
2170 T$(18)="520 410 S(S8,W4,X 7,Y 99)rd. "+TE$:GOTO 2220
2180 REM DAY 4-20 24-30
2190 T$(18)="520 410 S(S8,W4,X 7,Y 99)th. "+TE$
2200 REM      NAME FORTUNES
2210 REM   *****---- RIGHT  JUSTIFY  ----*****
2220 TX$="2420":TY$=STR$(980+INT((10-LEN(NA$))*17.5))
2230 T$(3)=TX$+TY$+" "+SIZE2$+NA$+"'S "+"FORTUNES"+TE$
2240 REM
2250 REM    NAME (SMALL)
2260 REM  *****---- CENTER  JUSTIFY  ----*****
2270 TY$=STR$(926+((INT((10-LEN(NA$))/2))*12)):TX$="2281"
2280 TN$=TX$+TY$+" "+SIZE1$+NA$
2290 T$(4)=TN$+TE$
2300 REM
```

```
2310 REM        Bye Bye NAME
2320 T$(5)="2971 928 "+SIZE1$+"Bye Bye"+TE$
2330 TY$=STR$(908+((INT((10-LEN(NA$))/2))*12)):TX$="3001"
2340 TB$=TX$+TY$+" "+SIZE1$+NA$
2350 T$(6)=TB$+TE$
2360 REM
2370 REM   **  NAME IN LOVE   **
2380 TY$=STR$(1811+INT((10-LEN(NA$))*17.5)):TX$="1120"
2390 TL$=TX$+TY$+" "+SIZE2$+NA$
2400 T$(7)=TL$+TE$
2410 T$(8)="1170 1866 "+SIZE2$+"IN LOVE"+TE$
2420 IF S<>1 THEN 2620
2430 T$(1)="1385 17 "+SIZE2$+"THE"
2440 REM   IN LOVE
2450 TY$=STR$(1811+INT((10-LEN(NA$))*17.5)):TX$="1120"
2460 TL$=TX$+TY$+" "+SIZE2$+NA$
2470 T$(7)=TL$+TE$
2480 T$(8)="1170 1866 "+SIZE2$+"IN LOVE"+TE$
2490 REM   AT PLAY
2500 TY$=STR$(1800+INT((10-LEN(NA$))*17.5)):TX$="2120"
2510 TP$=TX$+TY$+" "+SIZE2$+NA$
2520 T$(9)=TP$+TE$
2530 T$(10)="2170 1855 "+SIZE2$+"AT PLAY"+TE$
2540 IF B$="M" THEN 2570
2550 T$(11)="1550 1420 "+SIZE1$+"his"+TE$
2560 GOTO 2580
2570 T$(11)="1550 1420 "+SIZE1$+"her"+TE$
2580 TX$="1510":TY$=STR$(1530+INT((10-LEN(NA$))*12))
2590 T$(12)=TX$+TY$+" "+SIZE1$+NA$+TE$
2600 REM CAP.   NAME     MALE="HER"  FEMALE="HIS"
2610 REM CHECK FOR FEMALE
2620 IF S<>2 THEN 2770
2630 T$(1)="1235 17 "+SIZE2$+"THE"
2640 REM   IN LOVE
2650 TY$=STR$(1821+INT((10-LEN(NA$))*17.5)):TX$="1140"
2660 TL$=TX$+TY$+" "+SIZE2$+NA$
2670 T$(7)=TL$+TE$
2680 T$(8)="1190 1876 "+SIZE2$+"IN LOVE"+TE$
2690 REM   AT PLAY
2700 TY$=STR$(1811+INT((10-LEN(NA$))*17.5)):TX$="2130"
2710 TP$=TX$+TY$+" "+SIZE2$+NA$
2720 T$(9)=TP$+TE$
2730 T$(10)="2180 1866 "+SIZE2$+"AT PLAY"+TE$
2740 TX$="1500":TY$=STR$(1550+INT((10-LEN(NA$))*12))
2750 T$(11)=TX$+TY$+" "+SIZE1$+NA$+TE$
2760 REM AQU.    NAME
2770 IF S<>3 THEN 2910
2780 T$(1)="1260 9 "+SIZE2$+"THE"
2790 REM   IN LOVE
2800 TY$=STR$(1821+INT((10-LEN(NA$))*17.5)):TX$="1150"
2810 TL$=TX$+TY$+" "+SIZE2$+NA$
2820 T$(7)=TL$+TE$
2830 T$(8)="1200 1876 "+SIZE2$+"IN LOVE"+TE$
2840 REM   AT PLAY
2850 TY$=STR$(1819+INT((10-LEN(NA$))*17.5)):TX$="2120"
2860 TP$=TX$+TY$+" "+SIZE2$+NA$
2870 T$(9)=TP$+TE$
2880 T$(10)="2170 1874 "+SIZE2$+"AT PLAY"+TE$
2890 TX$="1490":TY$=STR$(1750+INT((10-LEN(NA$))*12))
2900 REM PISCES   NAME
2910 IF S<>4 THEN 3100
2920 T$(1)="1360 9 "+SIZE2$+"THE"
2930 REM   IN LOVE
2940 TY$=STR$(1801+INT((10-LEN(NA$))*17.5)):TX$="1128"
2950 TL$=TX$+TY$+" "+SIZE2$+NA$
2960 T$(7)=TL$+TE$
2970 T$(8)="1178 1856 "+SIZE2$+"IN LOVE"+TE$
2980 T$(11)=TX$+TY$+" "+SIZE1$+NA$+TE$
2990 REM   AT PLAY
3000 TY$=STR$(1799+INT((10-LEN(NA$))*17.5)):TX$="2135"
3010 TP$=TX$+TY$+" "+SIZE2$+NA$
```

```
3020 T$(9)=TP$+TE$
3030 T$(10)="2185 1854 "+SIZE2$+"AT PLAY"+TE$
3040 REM ** NAME FORTUNES **
3050 TX$="2420":TY$=STR$(980+((INT((10-LEN(NA$))/2))*12))
3060 T$(3)=TX$+TY$+" "+SIZE2$+NA$+"'S "+"FORTUNES"+TE$
3070 TX$="1460":TY$=STR$(1580+INT((10-LEN(NA$))*12))
3080 T$(11)=TX$+TY$+" "+SIZE1$+NA$+TE$
3090 REM ARIES   NAME
3100 IF S()5 THEN 3250
3110 REM TAURUS  NAME
3120 T$(1)="1210 9 "+SIZE2$+"THE"
3130 REM   IN LOVE
3140 TY$=STR$(1811+INT((10-LEN(NA$))*17.5)):TX$="1120"
3150 TL$=TX$+TY$+" "+SIZE2$+NA$
3160 T$(7)=TL$+TE$
3170 T$(8)="1170 1866 "+SIZE2$+"IN LOVE"+TE$
3180 REM  AT PLAY
3190 TY$=STR$(1811+INT((10-LEN(NA$))*17.5)):TX$="2130"
3200 TP$=TX$+TY$+" "+SIZE2$+NA$
3210 T$(9)=TP$+TE$
3220 T$(10)="2180 1866 "+SIZE2$+"AT PLAY"+TE$
3230 TX$="1480":TY$=STR$(1590+INT((10-LEN(NA$))*12))
3240 T$(11)=TX$+TY$+" "+SIZE1$+NA$+TE$
3250 IF S()6 THEN 3430
3260 REM GEMINI  NAME
3270 T$(1)="1250 9 "+SIZE2$+"THE"
3280 REM   IN LOVE
3290 TY$=STR$(1811+INT((10-LEN(NA$))*17.5)):TX$="1135"
3300 TL$=TX$+TY$+" "+SIZE2$+NA$
3310 T$(7)=TL$+TE$
3320 T$(8)="1185 1866 "+SIZE2$+"IN LOVE"+TE$
3330 REM  AT PLAY
3340 TY$=STR$(1811+INT((10-LEN(NA$))*17.5)):TX$="2130"
3350 TP$=TX$+TY$+" "+SIZE2$+NA$
3360 T$(9)=TP$+TE$
3370 T$(10)="2180 1866 "+SIZE2$+"AT PLAY"+TE$
3380 REM ** NAME FORTUNES **
3390 TX$="2420":TY$=STR$(980+((INT((10-LEN(NA$))/2))*12))
3400 T$(3)=TX$+TY$+" "+SIZE2$+NA$+"'S "+"FORTUNES"+TE$
3410 TX$="1470":TY$=STR$(1530+INT((10-LEN(NA$))*12))
3420 T$(11)=TX$+TY$+" "+SIZE1$+NA$+TE$
3430 IF S()7 THEN 3620
3440 REM CANCER  NAME   MALE="He"  FEMALE="She"
3450 REM  CHECK FOR FEMALE
3460 T$(1)="1380 1 "+SIZE2$+"THE"
3470 REM   IN LOVE
3480 TY$=STR$(1819+INT((10-LEN(NA$))*17.5)):TX$="1112"
3490 TL$=TX$+TY$+" "+SIZE2$+NA$
3500 T$(7)=TL$+TE$
3510 T$(8)="1162 1874 "+SIZE2$+"IN LOVE"+TE$
3520 REM  AT PLAY
3530 TY$=STR$(1811+INT((10-LEN(NA$))*17.5)):TX$="2118"
3540 TP$=TX$+TY$+" "+SIZE2$+NA$
3550 T$(9)=TP$+TE$
3560 T$(10)="2168 1866 "+SIZE2$+"AT PLAY"+TE$
3570 IF B$="M" THEN 3600
3580 T$(11)="1550 1420 "+SIZE1$+"She"+TE$
3590 GOTO 3610
3600 T$(11)="1550 1420 "+SIZE1$+"He"+TE$
3610 T$(12)="1460 1590 "+SIZE1$+NAM$+TE$
3620 IF S()8 THEN 3820
3630 REM LEO          MALE="Woman",NAME   FEMALE="Men",NAME
3640 REM CHECK FOR FEMALE
3650 T$(1)="1270 9 "+SIZE2$+"THE"
3660 REM   IN LOVE
3670 TY$=STR$(1811+INT((10-LEN(NA$))*17.5)):TX$="1120"
3680 TL$=TX$+TY$+" "+SIZE2$+NA$
3690 T$(7)=TL$+TE$
3700 T$(8)="1170 1866 "+SIZE2$+"IN LOVE"+TE$
3710 REM  AT PLAY
3720 TY$=STR$(1811+INT((10-LEN(NA$))*17.5)):TX$="2130"
```

```
3730 TP$=TX$+TY$+" "+SIZE2$+NA$
3740 T$(9)=TP$+TE$
3750 T$(10)="2180 1866 "+SIZE2$+"AT PLAY"+TE$
3760 TX$="1530":TY$=STR$(1660+INT((10-LEN(NA$))*12))
3770 T$(11)=TX$+TY$+" "+SIZE1$+NA$+TE$
3780 IF B$="M" THEN 3810
3790 T$(12)="1460 1550 "+SIZE1$+"Men"+TE$
3800 GOTO 3820
3810 T$(12)="1460 1550 "+SIZE1$+"Woman"+TE$
3820 IF S<>9 THEN 3970
3830 REM VIRGO     NAME
3840 T$(1)="1280 1 "+SIZE2$+"THE"
3850 REM    IN LOVE
3860 TY$=STR$(1821+INT((10-LEN(NA$))*17.5)):TX$="1130"
3870 TL$=TX$+TY$+" "+SIZE2$+NA$
3880 T$(7)=TL$+TE$
3890 T$(8)="1180 1876 "+SIZE2$+"IN LOVE"+TE$
3900 REM   AT PLAY
3910 TY$=STR$(1811+INT((10-LEN(NA$))*17.5)):TX$="2130"
3920 TP$=TX$+TY$+" "+SIZE2$+NA$
3930 T$(9)=TP$+TE$
3940 T$(10)="2180 1866 "+SIZE2$+"AT PLAY"+TE$
3950 TX$="1470":TY$=STR$(1770+INT((10-LEN(NA$))*12))
3960 T$(11)=TX$+TY$+" "+SIZE1$+NA$+TE$
3970 IF S<>10 THEN 4120
3980 REM LIBRA     NAME
3990 T$(1)="1285 1 "+SIZE2$+"THE"
4000 REM    IN LOVE
4010 TY$=STR$(1813+INT((10-LEN(NA$))*17.5)):TX$="1140"
4020 TL$=TX$+TY$+" "+SIZE2$+NA$
4030 T$(7)=TL$+TE$
4040 T$(8)="1190 1868 "+SIZE2$+"IN LOVE"+TE$
4050 REM   AT PLAY
4060 TY$=STR$(1811+INT((10-LEN(NA$))*17.5)):TX$="2130"
4070 TP$=TX$+TY$+" "+SIZE2$+NA$
4080 T$(9)=TP$+TE$
4090 T$(10)="2180 1866 "+SIZE2$+"AT PLAY"+TE$
4100 TX$="1500":TY$=STR$(1590+INT((10-LEN(NA$))*12))
4110 T$(11)=TX$+TY$+" "+SIZE1$+NA$+TE$
4120 IF S<>11 THEN 4260
4130 REM SCORPIO   NAME
4140 T$(1)="1295 9 "+SIZE2$+"THE"
4150 REM    IN LOVE
4160 TY$=STR$(1811+INT((10-LEN(NA$))*17.5)):TX$="1145"
4170 TL$=TX$+TY$+" "+SIZE2$+NA$
4180 T$(7)=TL$+TE$
4190 T$(8)="1195 1866 "+SIZE2$+"IN LOVE"+TE$
4200 REM   AT PLAY
4210 TY$=STR$(1811+INT((10-LEN(NA$))*17.5)):TX$="2130"
4220 TP$=TX$+TY$+" "+SIZE2$+NA$
4230 T$(9)=TP$+TE$
4240 T$(10)="2180 1866 "+SIZE2$+"AT PLAY"+TE$
4250 T$(11)="1470 1570 "+SIZE2$+NAM$+TE$
4260 IF S<>12 THEN 4410
4270 REM SAG.      NAME
4280 T$(1)="1250 19 "+SIZE2$+"THE"
4290 REM    IN LOVE
4300 TY$=STR$(1811+INT((10-LEN(NA$))*17.5)):TX$="1170"
4310 TL$=TX$+TY$+" "+SIZE2$+NA$
4320 T$(7)=TL$+TE$
4330 T$(8)="1220 1866 "+SIZE2$+"IN LOVE"+TE$
4340 REM  AT PLAY
4350 TY$=STR$(1811+INT((10-LEN(NA$))*17.5)):TX$="2130"
4360 TP$=TX$+TY$+" "+SIZE2$+NA$
4370 T$(9)=TP$+TE$
4380 T$(10)="2180 1866 "+SIZE2$+"AT PLAY"+TE$
4390 TX$="1470":TY$=STR$(1570+INT((10-LEN(NA$))*12))
4400 T$(11)=TX$+TY$+" "+SIZE1$+NA$+TE$
4410 COMMON A$,B$,C$,D$,E$,F$,G$,H$,I$,J$
4420 COMMON SP1$,SP2$,SC1$,NO$,NA$,NAM$
4430 COMMON FA$,EY$,HA$,BE$,GL$
```

```
4440 COMMON SIGN$,S,SP,D(),T$(),G,H
4450 CHAIN"SEAN2"
4460 REM  THIS IS PROGRAM "SEAN2" CHAINED
4470 REM  FROM PROGRAM "HUMOR".
4480 IF NO$="CFBLG" THEN PN=1:BN=1:SN=1
4490 IF NO$="CFOLG" THEN PN=2:BN=2:SN=2
4500 IF NO$="CFWLG" THEN PN=2:BN=2:SN=2
4510 IF NO$="CMBLG" THEN PN=3:BN=3:SN=1
4520 IF NO$="CMOLG" THEN PN=4:BN=4:SN=3
4530 IF NO$="CMWLG" THEN PN=4:BN=4:SN=3
4540 IF NO$="AFBLG" THEN PN=5:BN=5:SN=4
4550 IF NO$="AFOLG" THEN PN=6:BN=6:SN=5
4560 IF NO$="AFWLG" THEN PN=6:BN=6:SN=5
4570 IF NO$="AMBLG" THEN PN=7:BN=7:SN=6
4580 IF NO$="AMOLG" THEN PN=8:BN=8:SN=7
4590 IF NO$="AMWLG" THEN PN=8:BN=8:SN=7
4600 IF NO$="TFBLG" THEN PN=1:BN=5:SN=4
4610 IF NO$="TFOLG" THEN PN=2:BN=6:SN=5
4620 IF NO$="TFWLG" THEN PN=2:BN=6:SN=5
4630 IF NO$="TMBLG" THEN PN=3:BN=9:SN=6
4640 IF NO$="TMOLG" THEN PN=4:BN=10:SN=7
4650 IF NO$="TMWLG" THEN PN=4:BN=10:SN=7
4660 IF NO$="CFBMD" THEN PN=9:BN=11:SN=8
4670 IF NO$="CFOMD" THEN PN=10:BN=12:SN=9
4680 IF NO$="CFWMD" THEN PN=10:BN=12:SN=9
4690 IF NO$="CMBMD" THEN PN=11:BN=13:SN=8
4700 IF NO$="CMOMD" THEN PN=12:BN=14:SN=10
4710 IF NO$="CMWMD" THEN PN=12:BN=14:SN=10
4720 IF NO$="AFBMD" THEN PN=13:BN=15:SN=11
4730 IF NO$="AFOMD" THEN PN=14:BN=16:SN=12
4740 IF NO$="AFWMD" THEN PN=14:BN=16:SN=12
4750 IF NO$="AMBMD" THEN PN=15:BN=17:SN=13
4760 IF NO$="AMOMD" THEN PN=16:BN=18:SN=14
4770 IF NO$="AMWMD" THEN PN=16:BN=18:SN=14
4780 IF NO$="TFBMD" THEN PN=9:BN=15:SN=11
4790 IF NO$="TFOMD" THEN PN=10:BN=16:SN=12
4800 IF NO$="TFWMD" THEN PN=10:BN=16:SN=12
4810 IF NO$="TMBMD" THEN PN=11:BN=19:SN=13
4820 IF NO$="TMOMD" THEN PN=12:BN=20:SN=14
4830 IF NO$="TMWMD" THEN PN=12:BN=20:SN=14
4840 IF NO$="CFBSM" THEN PN=17:BN=21:SN=15
4850 IF NO$="CFOSM" THEN PN=18:BN=22:SN=16
4860 IF NO$="CFWSM" THEN PN=18:BN=22:SN=16
4870 IF NO$="CMBSM" THEN PN=19:BN=23:SN=15
4880 IF NO$="CMOSM" THEN PN=20:BN=24:SN=17
4890 IF NO$="CMWSM" THEN PN=20:BN=24:SN=17
4900 IF NO$="AFBSM" THEN PN=21:BN=25:SN=18
4910 IF NO$="AFOSM" THEN PN=22:BN=26:SN=19
4920 IF NO$="AFWSM" THEN PN=22:BN=26:SN=19
4930 IF NO$="AMBSM" THEN PN=23:BN=27:SN=20
4940 IF NO$="AMOSM" THEN PN=24:BN=28:SN=21
4950 IF NO$="AMWSM" THEN PN=24:BN=28:SN=21
4960 IF NO$="TFBSM" THEN PN=17:BN=25:SN=18
4970 IF NO$="TFOSM" THEN PN=22:BN=26:SN=19
4980 IF NO$="TFWSM" THEN PN=22:BN=26:SN=19
4990 IF NO$="TMBSM" THEN PN=19:BN=27:SN=20
5000 IF NO$="TMOSM" THEN PN=24:BN=29:SN=21
5010 IF NO$="TMWSM" THEN PN=24:BN=29:SN=21
5020 REM
5030 IF EY$="CFB" THEN PE=1:BE=1:SE=13
5040 IF EY$="CFO" THEN PE=2:BE=2:SE=2
5050 IF EY$="CFW" THEN PE=3:BE=3:SE=1
5060 IF EY$="CMB" THEN PE=4:BE=4:SE=14
5070 IF EY$="CMO" THEN PE=5:BE=5:SE=4
5080 IF EY$="CMW" THEN PE=6:BE=6:SE=3
5090 IF EY$="AFB" THEN PE=7:BE=7:SE=5
5100 IF EY$="AFO" THEN PE=8:BE=8:SE=6
5110 IF EY$="AFW" THEN PE=9:BE=9:SE=7
5120 IF EY$="AMB" THEN PE=10:BE=10:SE=8
5130 IF EY$="AMO" THEN PE=11:BE=12:SE=9
5140 IF EY$="AMW" THEN PE=12:BE=13:SE=10
```

```
5150 IF EY$="TFB" THEN PE=13:BE=7:SE=5
5160 IF EY$="TFO" THEN PE=8:BE=8:SE=6
5170 IF EY$="TFW" THEN PE=14:BE=14:SE=11
5180 IF EY$="TMB" THEN PE=10:BE=10:SE=8
5190 IF EY$="TMO" THEN PE=5:BE=15:SE=9
5200 IF EY$="TMW" THEN PE=15:BE=16:SE=12
5210 REM
5220 IF FA$="CFBT" THEN PF=1:BF=1:SF=1
5230 IF FA$="CFBF" THEN PF=2:BF=2:SF=2
5240 IF FA$="CFBA" THEN PF=3:BF=3:SF=3
5250 IF FA$="CMBT" THEN PF=4:BF=4:SF=4
5260 IF FA$="CMBF" THEN PF=5:BF=5:SF=5
5270 IF FA$="CMBA" THEN PF=6:BF=6:SF=6
5280 IF FA$="AFBT" THEN PF=7:BF=7:SF=7
5290 IF FA$="AFBF" THEN PF=8:BF=8:SF=8
5300 IF FA$="AFBA" THEN PF=9:BF=9:SF=9
5310 IF FA$="AMBT" THEN PF=10:BF=10:SF=19
5320 IF FA$="AMBF" THEN PF=11:BF=11:SF=18
5330 IF FA$="AMBA" THEN PF=12:BF=12:SF=20
5340 IF FA$="TFBT" THEN PF=7:BF=7:SF=7
5350 IF FA$="TFBF" THEN PF=8:BF=8:SF=8
5360 IF FA$="TFBA" THEN PF=9:BF=9:SF=17
5370 IF FA$="TMBT" THEN PF=10:BF=10:SF=10
5380 IF FA$="TMBF" THEN PF=11:BF=11:SF=11
5390 IF FA$="TMBA" THEN PF=12:BF=12:SF=16
5400 IF FA$="CFOT" THEN PF=13:BF=13:SF=1
5410 IF FA$="CFOF" THEN PF=14:BF=14:SF=2
5420 IF FA$="CFOA" THEN PF=15:BF=15:SF=3
5430 IF FA$="CMOT" THEN PF=16:BF=16:SF=4
5440 IF FA$="CMOF" THEN PF=17:BF=17:SF=5
5450 IF FA$="CMOA" THEN PF=18:BF=18:SF=6
5460 IF FA$="AFOT" THEN PF=19:BF=19:SF=13
5470 IF FA$="AFOF" THEN PF=20:BF=20:SF=14
5480 IF FA$="AFOA" THEN PF=21:BF=21:SF=15
5490 IF FA$="AMOT" THEN PF=22:BF=22:SF=10
5500 IF FA$="AMOF" THEN PF=23:BF=23:SF=11
5510 IF FA$="AMOA" THEN PF=24:BF=24:SF=12
5520 IF FA$="TFOT" THEN PF=13:BF=19:SF=13
5530 IF FA$="TFOF" THEN PF=20:BF=20:SF=14
5540 IF FA$="TFOA" THEN PF=25:BF=21:SF=17
5550 IF FA$="TMOT" THEN PF=22:BF=22:SF=10
5560 IF FA$="TMOF" THEN PF=23:BF=23:SF=11
5570 IF FA$="TMOA" THEN PF=26:BF=24:SF=16
5580 IF FA$="CFWT" THEN PF=13:BF=13:SF=1
5590 IF FA$="CFWF" THEN PF=14:BF=14:SF=2
5600 IF FA$="CFWA" THEN PF=15:BF=15:SF=3
5610 IF FA$="CMWT" THEN PF=16:BF=16:SF=4
5620 IF FA$="CMWF" THEN PF=17:BF=17:SF=5
5630 IF FA$="CMWA" THEN PF=18:BF=18:SF=6
5640 IF FA$="AFWT" THEN PF=19:BF=19:SF=13
5650 IF FA$="AFWF" THEN PF=20:BF=20:SF=14
5660 IF FA$="AFWA" THEN PF=21:BF=21:SF=15
5670 IF FA$="AMWT" THEN PF=22:BF=22:SF=10
5680 IF FA$="AMWF" THEN PF=23:BF=23:SF=11
5690 IF FA$="AMWA" THEN PF=24:BF=24:SF=12
5700 IF FA$="TFWT" THEN PF=13:BF=19:SF=13
5710 IF FA$="TFWF" THEN PF=20:BF=20:SF=14
5720 IF FA$="TFWA" THEN PF=25:BF=21:SF=17
5730 IF FA$="TMWT" THEN PF=22:BF=22:SF=10
5740 IF FA$="TMWF" THEN PF=23:BF=23:SF=11
5750 IF FA$="TMWA" THEN PF=26:BF=24:SF=16
5760 REM
5770 IF I$="N" THEN 5980:   REM SKIP OVER GL CHECK
5780 REM
5790 IF GL$="CFB" THEN PG=1:BG=1:SG=1
5800 IF GL$="CFO" THEN PG=2:BG=4:SG=1
5810 IF GL$="CFW" THEN PG=1:BG=4:SG=1
5820 IF GL$="CMB" THEN PG=3:BG=4:SG=1
5830 IF GL$="CMO" THEN PG=2:BG=4:SG=1
5840 IF GL$="CMW" THEN PG=3:BG=4:SG=1
5850 IF GL$="AFB" THEN PG=4:BG=2:SG=2
```

```
5860 IF GL$="AFO" THEN PG=5:BG=5:SG=2
5870 IF GL$="AFW" THEN PG=4:BG=6:SG=2
5880 IF GL$="AMB" THEN PG=6:BG=3:SG=3
5890 IF GL$="AMO" THEN PG=7:BG=7:SG=3
5900 IF GL$="AMW" THEN PG=6:BG=8:SG=3
5910 IF GL$="TFB" THEN PG=8:BG=9:SG=2
5920 IF GL$="TFO" THEN PG=9:BG=10:SG=2
5930 IF GL$="TFW" THEN PG=8:BG=11:SG=2
5940 IF GL$="TMB" THEN PG=10:BG=3:SG=3
5950 IF GL$="TMO" THEN PG=11:BG=12:SG=3
5960 IF GL$="TMW" THEN PG=12:BG=13:SG=3
5970 REM
5980 IF G$="NN" THEN 6360:REM SKIP OVER CHECK
5990 REM
6000 IF BE$="AMBLFB" THEN PB=1:BB=1:SB=1
6010 IF BE$="AMBLGG" THEN PB=2:BB=2:SB=9
6020 IF BE$="AMBLMS" THEN PB=3:BB=4:SB=3
6030 IF BE$="AMBDFB" THEN PB=6:BB=7:SB=2
6040 IF BE$="AMBDGG" THEN PB=7:BB=2:SB=9
6050 IF BE$="AMBDMS" THEN PB=3:BB=4:SB=3
6060 IF BE$="TMBLFB" THEN PB=1:BB=2:SB=1
6070 IF BE$="TMBLGG" THEN PB=2:BB=2:SB=9
6080 IF BE$="TMBLMS" THEN PB=3:BB=4:SB=4
6090 IF BE$="TMBDFB" THEN PB=6:BB=2:SB=2
6100 IF BE$="TMBDGG" THEN PB=7:BB=2:SB=9
6110 IF BE$="TMBDMS" THEN PB=3:BB=4:SB=4
6120 IF BE$="AMOLFB" THEN PB=10:BB=3:SB=7
6130 IF BE$="AMOLGG" THEN PB=10:BB=3:SB=7
6140 IF BE$="AMOLMS" THEN PB=8:BB=6:SB=8
6150 IF BE$="AMODFB" THEN PB=9:BB=3:SB=7
6160 IF BE$="AMODGG" THEN PB=9:BB=3:SB=7
6170 IF BE$="AMODMS" THEN PB=8:BB=6:SB=8
6180 IF BE$="TMOLFB" THEN PB=9:BB=3:SB=7
6190 IF BE$="TMOLGG" THEN PB=9:BB=3:SB=7
6200 IF BE$="TMOLMS" THEN PB=8:BB=6:SB=8
6210 IF BE$="TMODFB" THEN PB=9:BB=3:SB=7
6220 IF BE$="TMODGG" THEN PB=9:BB=3:SB=7
6230 IF BE$="TMODMS" THEN PB=8:BB=6:SB=8
6240 IF BE$="AMWLFB" THEN PB=1:BB=1:SB=1
6250 IF BE$="AMWLGG" THEN PB=2:BB=2:SB=9
6260 IF BE$="AMWLMS" THEN PB=4:BB=5:SB=5
6270 IF BE$="AMWDFB" THEN PB=6:BB=7:SB=2
6280 IF BE$="AMWDGG" THEN PB=7:BB=2:SB=9
6290 IF BE$="AMWDMS" THEN PB=5:BB=8:SB=6
6300 IF BE$="TMWLFB" THEN PB=1:BB=2:SB=9
6310 IF BE$="TMWLGG" THEN PB=2:BB=2:SB=9
6320 IF BE$="TMWLMS" THEN PB=3:BB=4:SB=4
6330 IF BE$="TMWDFB" THEN PB=6:BB=2:SB=9
6340 IF BE$="TMWDGG" THEN PB=7:BB=2:SB=9
6350 IF BE$="TMWDMS" THEN PB=3:BB=4:SB=4
6360 IF C$="B" THEN PF$(6)="PBM1:REM DRAW AFRO
6370 IF C$="B" AND B$="F" THEN PF$(7)="PEAR:REM EARING
6380 IF CC$="M" THEN PF$(8)="PMT1:REM MARTIAN
6390 COMMON D(),A$,B$,C$,D$,E$,F$,G$,H$,I$,J$
6400 COMMON SP1$,SP2$,SC1$,NO$,FA$,PG,BG,SG,PB,BB,SB
6410 COMMON EY$,HA$,BE$,GL$,NA$,NAM$,PN,BN,SN,PE,BE,SE
6420 COMMON SIGN$,S,T$(),PF$(),BF$(),SF$(),G,H,PF,BF,SF
6430 CHAIN"SEAN3"
6440 REM  PROGRAM "SEAN3". CHAINED FROM
6450 REM  PROGRAM "SEAN2".
6460 IF HA$="CFOLSTBD" THEN BH=13:SH=13
6470 IF HA$="CFODSTBD" THEN BH=13:SH=13
6480 IF HA$="CFOLSTBG" THEN BH=13:SH=13
6490 IF HA$="CFODSTBG" THEN BH=13:SH=13
6500 IF HA$="CFOLSTCR" THEN BH=13:SH=13
6510 IF HA$="CFODSTCR" THEN BH=13:SH=13
6520 IF HA$="CFOLSTSS" THEN BH=13:SH=13
6530 IF HA$="CFODSTSS" THEN BH=14:SH=14
6540 IF HA$="CFOLSTME" THEN BH=15:SH=15
6550 IF HA$="CFODSTME" THEN BH=16:SH=16
6560 IF HA$="CFOLSTLL" THEN BH=17:SH=17
```

```
6570 IF HA$="CFODSTLL" THEN BH=18:SH=18
6580 IF HA$="CFOLWBBD" THEN BH=19:SH=19
6590 IF HA$="CFODWBBD" THEN BH=20:SH=19
6600 IF HA$="CFOLWBBG" THEN BH=19:SH=19
6610 IF HA$="CFODWBBG" THEN BH=20:SH=19
6620 IF HA$="CFOLWBCR" THEN BH=19:SH=19
6630 IF HA$="CFODWBCR" THEN BH=20:SH=19
6640 IF HA$="CFOLWBSS" THEN BH=19:SH=19
6650 IF HA$="CFODWBSS" THEN BH=20:SH=20
6660 IF HA$="CFOLWBME" THEN BH=21:SH=21
6670 IF HA$="CFODWBME" THEN BH=22:SH=22
6680 IF HA$="CFOLWBLL" THEN BH=23:SH=23
6690 IF HA$="CFODWBLL" THEN BH=24:SH=24
6700 IF HA$="CFOLFZBD" THEN BH=25:SH=25
6710 IF HA$="CFODFZBD" THEN BH=26:SH=25
6720 IF HA$="CFOLFZBG" THEN BH=25:SH=25
6730 IF HA$="CFODFZBG" THEN BH=26:SH=25
6740 IF HA$="CFOLFZCR" THEN BH=25:SH=25
6750 IF HA$="CFODFZCR" THEN BH=26:SH=25
6760 IF HA$="CFOLFZSS" THEN BH=25:SH=25
6770 IF HA$="CFODFZSS" THEN BH=26:SH=26
6780 IF HA$="CFOLFZME" THEN BH=27:SH=27
6790 IF HA$="CFODFZME" THEN BH=28:SH=28
6800 IF HA$="CFOLFZLL" THEN BH=29:SH=29
6810 IF HA$="CFODFZLL" THEN BH=30:SH=30
6820 IF HA$="CFOLWVBD" THEN BH=19:SH=19
6830 IF HA$="CFODWVBD" THEN BH=20:SH=19
6840 IF HA$="CFOLWVBG" THEN BH=19:SH=19
6850 IF HA$="CFODWVBG" THEN BH=20:SH=19
6860 IF HA$="CFOLWVCR" THEN BH=19:SH=19
6870 IF HA$="CFODWVCR" THEN BH=20:SH=19
6880 IF HA$="CFOLWVSS" THEN BH=19:SH=19
6890 IF HA$="CFODWVSS" THEN BH=20:SH=20
6900 IF HA$="CFOLWVME" THEN BH=21:SH=21
6910 IF HA$="CFODWVME" THEN BH=22:SH=22
6920 IF HA$="CFOLWVLL" THEN BH=23:SH=23
6930 IF HA$="CFODWVLL" THEN BH=24:SH=24
6940 IF HA$="CFOLCYBD" THEN BH=25:SH=25
6950 IF HA$="CFODCYBD" THEN BH=26:SH=25
6960 IF HA$="CFOLCYBG" THEN BH=25:SH=25
6970 IF HA$="CFODCYBG" THEN BH=26:SH=25
6980 IF HA$="CFOLCYCR" THEN BH=25:SH=25
6990 IF HA$="CFODCYCR" THEN BH=26:SH=25
7000 IF HA$="CFOLCYSS" THEN BH=25:SH=25
7010 IF HA$="CFODCYSS" THEN BH=26:SH=26
7020 IF HA$="CFOLCYME" THEN BH=27:SH=27
7030 IF HA$="CFODCYME" THEN BH=28:SH=28
7040 IF HA$="CFOLCYLL" THEN BH=29:SH=29
7050 IF HA$="CFODCYLL" THEN BH=30:SH=30
7060 IF HA$="CFOLAFBD" THEN BH=11:SH=11
7070 IF HA$="CFODAFBD" THEN BH=12:SH=12
7080 IF HA$="CFOLAFBG" THEN BH=11:SH=11
7090 IF HA$="CFODAFBG" THEN BH=12:SH=12
7100 IF HA$="CFOLAFCR" THEN BH=11:SH=11
7110 IF HA$="CFODAFCR" THEN BH=12:SH=12
7120 IF HA$="CFOLAFSS" THEN BH=11:SH=11
7130 IF HA$="CFODAFSS" THEN BH=12:SH=12
7140 IF HA$="CFOLAFME" THEN BH=11:SH=11
7150 IF HA$="CFODAFME" THEN BH=12:SH=12
7160 IF HA$="CFOLAFLL" THEN BH=11:SH=11
7170 IF HA$="CFODAFLL" THEN BH=12:SH=12
7180 IF HA$="CMOLSTBD" THEN BH=82:SH=79
7190 IF HA$="CMODSTBD" THEN BH=82:SH=79
7200 IF HA$="CMOLSTBG" THEN BH=82:SH=79
7210 IF HA$="CMODSTBG" THEN BH=82:SH=79
7220 IF HA$="CMOLSTCR" THEN BH=82:SH=79
7230 IF HA$="CMODSTCR" THEN BH=82:SH=79
7240 IF HA$="CMOLSTSS" THEN BH=83:SH=73
7250 IF HA$="CMODSTSS" THEN BH=84:SH=74
7260 IF HA$="CMOLSTME" THEN BH=85:SH=75
7270 IF HA$="CMODSTME" THEN BH=86:SH=76
```

```
7280 IF HA$="CMOLSTLL" THEN BH=87:SH=77
7290 IF HA$="CMODSTLL" THEN BH=88:SH=78
7300 IF HA$="CMOLWBBD" THEN BH=97:SH=79
7310 IF HA$="CMODWBBD" THEN BH=97:SH=79
7320 IF HA$="CMOLWBBG" THEN BH=97:SH=79
7330 IF HA$="CMODWBBG" THEN BH=97:SH=79
7340 IF HA$="CMOLWBCR" THEN BH=82:SH=79
7350 IF HA$="CMODWBCR" THEN BH=82:SH=79
7360 IF HA$="CMOLWBSS" THEN BH=97:SH=67
7370 IF HA$="CMODWBSS" THEN BH=98:SH=68
7380 IF HA$="CMOLWBME" THEN BH=99:SH=69
7390 IF HA$="CMODWBME" THEN BH=100:SH=70
7400 IF HA$="CMOLWBLL" THEN BH=101:SH=71
7410 IF HA$="CMODWBLL" THEN BH=102:SH=72
7420 IF HA$="CMOLFZBD" THEN BH=82:SH=79
7430 IF HA$="CMODFZBD" THEN BH=82:SH=79
7440 IF HA$="CMOLFZBG" THEN BH=82:SH=79
7450 IF HA$="CMODFZBG" THEN BH=82:SH=79
7460 IF HA$="CMOLFZCR" THEN BH=82:SH=79
7470 IF HA$="CMODFZCR" THEN BH=82:SH=79
7480 IF HA$="CMOLFZSS" THEN BH=91:SH=80
7490 IF HA$="CMODFZSS" THEN BH=92:SH=81
7500 IF HA$="CMOLFZME" THEN BH=93:SH=82
7510 IF HA$="CMODFZME" THEN BH=94:SH=83
7520 IF HA$="CMOLFZLL" THEN BH=95:SH=84
7530 IF HA$="CMODFZLL" THEN BH=96:SH=85
7540 IF HA$="CMOLWVBD" THEN BH=97:SH=79
7550 IF HA$="CMODWVBD" THEN BH=97:SH=79
7560 IF HA$="CMOLWVBG" THEN BH=97:SH=79
7570 IF HA$="CMODWVBG" THEN BH=97:SH=79
7580 IF HA$="CMOLWVCR" THEN BH=82:SH=79
7590 IF HA$="CMODWVCR" THEN BH=82:SH=79
7600 IF HA$="CMOLWVSS" THEN BH=97:SH=67
7610 IF HA$="CMODWVSS" THEN BH=98:SH=68
7620 IF HA$="CMOLWVME" THEN BH=99:SH=69
7630 IF HA$="CMODWVME" THEN BH=100:SH=70
7640 IF HA$="CMOLWVLL" THEN BH=101:SH=71
7650 IF HA$="CMODWVLL" THEN BH=102:SH=72
7660 IF HA$="CMOLCYBD" THEN BH=82:SH=79
7670 IF HA$="CMODCYBD" THEN BH=82:SH=79
7680 IF HA$="CMOLCYBG" THEN BH=82:SH=79
7690 IF HA$="CMODCYBG" THEN BH=82:SH=79
7700 IF HA$="CMOLCYCR" THEN BH=82:SH=79
7710 IF HA$="CMODCYCR" THEN BH=82:SH=79
7720 IF HA$="CMOLCYSS" THEN BH=91:SH=80
7730 IF HA$="CMODCYSS" THEN BH=92:SH=81
7740 IF HA$="CMOLCYME" THEN BH=93:SH=82
7750 IF HA$="CMODCYME" THEN BH=94:SH=83
7760 IF HA$="CMOLCYLL" THEN BH=95:SH=84
7770 IF HA$="CMODCYLL" THEN BH=96:SH=85
7780 IF HA$="CMOLAFBD" THEN BH=11:SH=11
7790 IF HA$="CMODAFBD" THEN BH=12:SH=12
7800 IF HA$="CMOLAFBG" THEN BH=11:SH=11
7810 IF HA$="CMODAFBG" THEN BH=12:SH=12
7820 IF HA$="CMOLAFCR" THEN BH=11:SH=11
7830 IF HA$="CMODAFCR" THEN BH=12:SH=12
7840 IF HA$="CMOLAFSS" THEN BH=11:SH=11
7850 IF HA$="CMODAFSS" THEN BH=12:SH=12
7860 IF HA$="CMOLAFME" THEN BH=11:SH=11
7870 IF HA$="CMODAFME" THEN BH=12:SH=12
7880 IF HA$="CMOLAFLL" THEN BH=11:SH=11
7890 IF HA$="CMODAFLL" THEN BH=12:SH=12
7900 IF HA$="AFOLSTBD" THEN BH=90:SH=86
7910 IF HA$="AFODSTBD" THEN BH=90:SH=86
7920 IF HA$="AFOLSTBG" THEN BH=104:SH=87
7930 IF HA$="AFODSTBG" THEN BH=105:SH=88
7940 IF HA$="AFOLSTCR" THEN BH=106:SH=79
7950 IF HA$="AFODSTCR" THEN BH=89:SH=79
7960 IF HA$="AFOLSTSS" THEN BH=43:SH=43
7970 IF HA$="AFODSTSS" THEN BH=44:SH=44
7980 IF HA$="AFOLSTME" THEN BH=45:SH=45
```

```
7990 IF HA$="AFODSTME" THEN BH=46:SH=46
8000 IF HA$="AFOLSTLL" THEN BH=47:SH=47
8010 IF HA$="AFODSTLL" THEN BH=48:SH=48
8020 IF HA$="AFOLWBBD" THEN BH=90:SH=86
8030 IF HA$="AFODWBBD" THEN BH=90:SH=86
8040 IF HA$="AFOLWBBG" THEN BH=113:SH=95
8050 IF HA$="AFODWBBG" THEN BH=114:SH=96
8060 IF HA$="AFOLWBCR" THEN BH=106:SH=79
8070 IF HA$="AFODWBCR" THEN BH=89:SH=79
8080 IF HA$="AFOLWBSS" THEN BH=49:SH=37
8090 IF HA$="AFODWBSS" THEN BH=50:SH=38
8100 IF HA$="AFOLWBME" THEN BH=51:SH=39
8110 IF HA$="AFODWBME" THEN BH=52:SH=40
8120 IF HA$="AFOLWBLL" THEN BH=53:SH=41
8130 IF HA$="AFODWBLL" THEN BH=54:SH=42
8140 IF HA$="AFOLFZBD" THEN BH=90:SH=86
8150 IF HA$="AFODFZBD" THEN BH=90:SH=86
8160 IF HA$="AFOLFZBG" THEN BH=113:SH=103
8170 IF HA$="AFODFZBG" THEN BH=114:SH=104
8180 IF HA$="AFOLFZCR" THEN BH=106:SH=79
8190 IF HA$="AFODFZCR" THEN BH=89:SH=79
8200 IF HA$="AFOLFZSS" THEN BH=55:SH=49
8210 IF HA$="AFODFZSS" THEN BH=56:SH=50
8220 IF HA$="AFOLFZME" THEN BH=57:SH=51
8230 IF HA$="AFODFZME" THEN BH=58:SH=52
8240 IF HA$="AFOLFZLL" THEN BH=59:SH=53
8250 IF HA$="AFODFZLL" THEN BH=60:SH=54
8260 IF HA$="AFOLWVBD" THEN BH=90:SH=86
8270 IF HA$="AFODWVBD" THEN BH=90:SH=86
8280 IF HA$="AFOLWVBG" THEN BH=113:SH=95
8290 IF HA$="AFODWVBG" THEN BH=114:SH=96
8300 IF HA$="AFOLWVCR" THEN BH=106:SH=79
8310 IF HA$="AFODWVCR" THEN BH=89:SH=79
8320 IF HA$="AFOLWVSS" THEN BH=61:SH=55
8330 IF HA$="AFODWVSS" THEN BH=62:SH=56
8340 IF HA$="AFOLWVME" THEN BH=63:SH=57
8350 IF HA$="AFODWVME" THEN BH=64:SH=58
8360 IF HA$="AFOLWVLL" THEN BH=65:SH=59
8370 IF HA$="AFODWVLL" THEN BH=66:SH=60
8380 IF HA$="AFOLCYBD" THEN BH=90:SH=86
8390 IF HA$="AFODCYBD" THEN BH=90:SH=86
8400 IF HA$="AFOLCYBG" THEN BH=121:SH=103
8410 IF HA$="AFODCYBG" THEN BH=122:SH=104
8420 IF HA$="AFOLCYCR" THEN BH=106:SH=79
8430 IF HA$="AFODCYCR" THEN BH=89:SH=79
8440 IF HA$="AFOLCYSS" THEN BH=67:SH=61
8450 IF HA$="AFODCYSS" THEN BH=68:SH=62
8460 IF HA$="AFOLCYME" THEN BH=69:SH=63
8470 IF HA$="AFODCYME" THEN BH=70:SH=64
8480 IF HA$="AFOLCYLL" THEN BH=71:SH=65
8490 IF HA$="AFODCYLL" THEN BH=72:SH=66
8500 IF HA$="AFOLAFBD" THEN BH=11:SH=11
8510 IF HA$="AFODAFBD" THEN BH=12:SH=12
8520 IF HA$="AFOLAFBG" THEN BH=11:SH=11
8530 IF HA$="AFODAFBG" THEN BH=12:SH=12
8540 IF HA$="AFOLAFCR" THEN BH=11:SH=11
8550 IF HA$="AFODAFCR" THEN BH=12:SH=12
8560 IF HA$="AFOLAFSS" THEN BH=11:SH=11
8570 IF HA$="AFODAFSS" THEN BH=12:SH=12
8580 IF HA$="AFOLAFME" THEN BH=11:SH=11
8590 IF HA$="AFODAFME" THEN BH=12:SH=12
8600 IF HA$="AFOLAFLL" THEN BH=11:SH=11
8610 IF HA$="AFODAFLL" THEN BH=12:SH=12
8620 IF HA$="AMOLSTBD" THEN BH=103:SH=86
8630 IF HA$="AMODSTBD" THEN BH=103:SH=86
8640 IF HA$="AMOLSTBG" THEN BH=104:SH=87
8650 IF HA$="AMODSTBG" THEN BH=105:SH=88
8660 IF HA$="AMOLSTCR" THEN BH=106:SH=79
8670 IF HA$="AMODSTCR" THEN BH=89:SH=79
8680 IF HA$="AMOLSTSS" THEN BH=127:SH=89
8690 IF HA$="AMODSTSS" THEN BH=128:SH=90
```

```
8700 IF HA$="AMOLSTME" THEN BH=129:SH=91
8710 IF HA$="AMODSTME" THEN BH=130:SH=92
8720 IF HA$="AMOLSTLL" THEN BH=131:SH=93
8730 IF HA$="AMODSTLL" THEN BH=132:SH=94
8740 IF HA$="AMOLWBBD" THEN BH=103:SH=86
8750 IF HA$="AMODWBBD" THEN BH=103:SH=86
8760 IF HA$="AMOLWBBG" THEN BH=113:SH=95
8770 IF HA$="AMODWBBG" THEN BH=114:SH=96
8780 IF HA$="AMOLWBCR" THEN BH=106:SH=79
8790 IF HA$="AMODWBCR" THEN BH=89:SH=79
8800 IF HA$="AMOLWBSS" THEN BH=133:SH=97
8810 IF HA$="AMODWBSS" THEN BH=134:SH=98
8820 IF HA$="AMOLWBME" THEN BH=135:SH=99
8830 IF HA$="AMODWBME" THEN BH=136:SH=100
8840 IF HA$="AMOLWBLL" THEN BH=137:SH=101
8850 IF HA$="AMODWBLL" THEN BH=138:SH=102
8860 IF HA$="AMOLFZBD" THEN BH=103:SH=86
8870 IF HA$="AMODFZBD" THEN BH=103:SH=86
8880 IF HA$="AMOLFZBG" THEN BH=121:SH=103
8890 IF HA$="AMODFZBG" THEN BH=122:SH=104
8900 IF HA$="AMOLFZCR" THEN BH=106:SH=79
8910 IF HA$="AMODFZCR" THEN BH=89:SH=79
8920 IF HA$="AMOLFZSS" THEN BH=139:SH=105
8930 IF HA$="AMODFZSS" THEN BH=140:SH=106
8940 IF HA$="AMOLFZME" THEN BH=141:SH=107
8950 IF HA$="AMODFZME" THEN BH=142:SH=108
8960 IF HA$="AMOLFZLL" THEN BH=143:SH=109
8970 IF HA$="AMODFZLL" THEN BH=144:SH=110
8980 IF HA$="AMOLWVBD" THEN BH=103:SH=86
8990 IF HA$="AMODWVBD" THEN BH=103:SH=86
9000 IF HA$="AMOLWVBG" THEN BH=113:SH=95
9010 IF HA$="AMODWVBG" THEN BH=114:SH=96
9020 IF HA$="AMOLWVCR" THEN BH=106:SH=79
9030 IF HA$="AMODWVCR" THEN BH=89:SH=79
9040 IF HA$="AMOLWVSS" THEN BH=145:SH=111
9050 IF HA$="AMODWVSS" THEN BH=146:SH=112
9060 IF HA$="AMOLWVME" THEN BH=147:SH=113
9070 IF HA$="AMODWVME" THEN BH=148:SH=114
9080 IF HA$="AMOLWVLL" THEN BH=149:SH=115
9090 IF HA$="AMODWVLL" THEN BH=150:SH=116
9100 IF HA$="AMOLCYBD" THEN BH=103:SH=86
9110 IF HA$="AMODCYBD" THEN BH=103:SH=86
9120 IF HA$="AMOLCYBG" THEN BH=121:SH=103
9130 IF HA$="AMODCYBG" THEN BH=122:SH=104
9140 IF HA$="AMOLCYCR" THEN BH=106:SH=79
9150 IF HA$="AMODCYCR" THEN BH=89:SH=79
9160 IF HA$="AMOLCYSS" THEN BH=139:SH=105
9170 IF HA$="AMODCYSS" THEN BH=140:SH=106
9180 IF HA$="AMOLCYME" THEN BH=141:SH=107
9190 IF HA$="AMODCYME" THEN BH=142:SH=108
9200 IF HA$="AMOLCYLL" THEN BH=143:SH=109
9210 IF HA$="AMODCYLL" THEN BH=144:SH=110
9220 IF HA$="AMOLAFBD" THEN BH=11:SH=11
9230 IF HA$="AMODAFBD" THEN BH=12:SH=12
9240 IF HA$="AMOLAFBG" THEN BH=11:SH=11
9250 IF HA$="AMODAFBG" THEN BH=12:SH=12
9260 IF HA$="AMOLAFCR" THEN BH=11:SH=11
9270 IF HA$="AMODAFCR" THEN BH=12:SH=12
9280 IF HA$="AMOLAFSS" THEN BH=11:SH=11
9290 IF HA$="AMODAFSS" THEN BH=12:SH=12
9300 IF HA$="AMOLAFME" THEN BH=11:SH=11
9310 IF HA$="AMODAFME" THEN BH=12:SH=12
9320 IF HA$="AMOLAFLL" THEN BH=11:SH=11
9330 IF HA$="AMODAFLL" THEN BH=12:SH=12
9340 COMMON D(),A$,B$,C$,D$,E$,F$,G$,H$,I$,J$
9350 COMMON SP1$,SP2$,SC1$,NO$,FA$,PG,BG,SG,PE,BE,SE,PB,BB,SB
9360 COMMON EY$,HA$,BE$,GL$,NA$,NAM$,PN,BN,SN,PF,BF,SF
9370 COMMON SIGN$,S,T$(),PF$(),BF$(),SF$(),SH,BH,G,H
9380 CHAIN"SEAN4"
```

```
9390 REM   PROGRAM  "SEAN4" CHAINED FROM
9400 REM   PROGRAM  "SEAN3".
9410 IF HA$="CFBLSTBD" THEN BH=1:SH=1
9420 IF HA$="CFBDSTBD" THEN BH=1:SH=1
9430 IF HA$="CFBLSTBG" THEN BH=1:SH=1
9440 IF HA$="CFBDSTBG" THEN BH=1:SH=1
9450 IF HA$="CFBLSTCR" THEN BH=1:SH=1
9460 IF HA$="CFBDSTCR" THEN BH=1:SH=1
9470 IF HA$="CFBLSTSS" THEN BH=1:SH=1
9480 IF HA$="CFBDSTSS" THEN BH=1:SH=1
9490 IF HA$="CFBLSTME" THEN BH=2:SH=2
9500 IF HA$="CFBDSTME" THEN BH=2:SH=2
9510 IF HA$="CFBLSTLL" THEN BH=3:SH=3
9520 IF HA$="CFBDSTLL" THEN BH=3:SH=3
9530 IF HA$="CFBLWBBD" THEN BH=4:SH=4
9540 IF HA$="CFBDWBBD" THEN BH=4:SH=4
9550 IF HA$="CFBLWBBG" THEN BH=4:SH=4
9560 IF HA$="CFBDWBBG" THEN BH=4:SH=4
9570 IF HA$="CFBLWBCR" THEN BH=4:SH=4
9580 IF HA$="CFBDWBCR" THEN BH=4:SH=4
9590 IF HA$="CFBLWBSS" THEN BH=4:SH=4
9600 IF HA$="CFBDWBSS" THEN BH=4:SH=4
9610 IF HA$="CFBLWBME" THEN BH=5:SH=5
9620 IF HA$="CFBDWBME" THEN BH=5:SH=5
9630 IF HA$="CFBLWBLL" THEN BH=6:SH=6
9640 IF HA$="CFBDWBLL" THEN BH=6:SH=6
9650 IF HA$="CFBLFZBD" THEN BH=7:SH=7
9660 IF HA$="CFBDFZBD" THEN BH=7:SH=7
9670 IF HA$="CFBLFZBG" THEN BH=8:SH=7
9680 IF HA$="CFBDFZBG" THEN BH=7:SH=7
9690 IF HA$="CFBLFZCR" THEN BH=8:SH=7
9700 IF HA$="CFBDFZCR" THEN BH=7:SH=7
9710 IF HA$="CFBLFZSS" THEN BH=8:SH=7
9720 IF HA$="CFBDFZSS" THEN BH=7:SH=7
9730 IF HA$="CFBLFZME" THEN BH=9:SH=10
9740 IF HA$="CFBDFZME" THEN BH=10:SH=10
9750 IF HA$="CFBLFZLL" THEN BH=11:SH=12
9760 IF HA$="CFBDFZLL" THEN BH=12:SH=12
9770 IF HA$="CFBLWVBD" THEN BH=4:SH=4
9780 IF HA$="CFBDWVBD" THEN BH=4:SH=4
9790 IF HA$="CFBLWVBG" THEN BH=4:SH=4
9800 IF HA$="CFBDWVBG" THEN BH=4:SH=4
9810 IF HA$="CFBLWVCR" THEN BH=4:SH=4
9820 IF HA$="CFBDWVCR" THEN BH=4:SH=4
9830 IF HA$="CFBLWVSS" THEN BH=4:SH=4
9840 IF HA$="CFBDWVSS" THEN BH=4:SH=4
9850 IF HA$="CFBLWVME" THEN BH=5:SH=5
9860 IF HA$="CFBDWVME" THEN BH=5:SH=5
9870 IF HA$="CFBLWVLL" THEN BH=6:SH=6
9880 IF HA$="CFBDWVLL" THEN BH=6:SH=6
9890 IF HA$="CFBLCYBD" THEN BH=8:SH=7
9900 IF HA$="CFBDCYBD" THEN BH=7:SH=7
9910 IF HA$="CFBLCYBG" THEN BH=8:SH=7
9920 IF HA$="CFBDCYBG" THEN BH=7:SH=7
9930 IF HA$="CFBLCYCR" THEN BH=8:SH=7
9940 IF HA$="CFBDCYCR" THEN BH=7:SH=7
9950 IF HA$="CFBLCYSS" THEN BH=8:SH=7
9960 IF HA$="CFBDCYSS" THEN BH=7:SH=7
9970 IF HA$="CFBLCYME" THEN BH=9:SH=10
9980 IF HA$="CFBDCYME" THEN BH=10:SH=10
9990 IF HA$="CFBLCYLL" THEN BH=11:SH=12
10000 IF HA$="CFBDCYLL" THEN BH=12:SH=12
10010 IF HA$="CFBLAFBD" THEN BH=11:SH=12
10020 IF HA$="CFBDAFBD" THEN BH=12:SH=12
10030 IF HA$="CFBLAFBG" THEN BH=11:SH=12
10040 IF HA$="CFBDAFBG" THEN BH=12:SH=12
10050 IF HA$="CFBLAFCR" THEN BH=11:SH=12
10060 IF HA$="CFBDAFCR" THEN BH=12:SH=12
10070 IF HA$="CFBLAFSS" THEN BH=11:SH=12
10080 IF HA$="CFBDAFSS" THEN BH=12:SH=12
10090 IF HA$="CFBLAFME" THEN BH=11:SH=12
```

```
10100 IF HA$="CFBDAFME" THEN BH=12:SH=12
10110 IF HA$="CFBLAFLL" THEN BH=11:SH=12
10120 IF HA$="CFBDAFLL" THEN BH=12:SH=12
10130 IF HA$="CMBLSTBD" THEN BH=79:SH=7
10140 IF HA$="CMBDSTBD" THEN BH=79:SH=7
10150 IF HA$="CMBLSTBG" THEN BH=79:SH=7
10160 IF HA$="CMBDSTBG" THEN BH=79:SH=7
10170 IF HA$="CMBLSTCR" THEN BH=79:SH=7
10180 IF HA$="CMBDSTCR" THEN BH=79:SH=7
10190 IF HA$="CMBLSTSS" THEN BH=73:SH=73
10200 IF HA$="CMBDSTSS" THEN BH=73:SH=74
10210 IF HA$="CMBLSTME" THEN BH=74:SH=75
10220 IF HA$="CMBDSTME" THEN BH=74:SH=76
10230 IF HA$="CMBLSTLL" THEN BH=75:SH=77
10240 IF HA$="CMBDSTLL" THEN BH=75:SH=78
10250 IF HA$="CMBLWBBD" THEN BH=76:SH=7
10260 IF HA$="CMBDWBBD" THEN BH=76:SH=7
10270 IF HA$="CMBLWBBG" THEN BH=76:SH=7
10280 IF HA$="CMBDWBBG" THEN BH=76:SH=7
10290 IF HA$="CMBLWBCR" THEN BH=79:SH=7
10300 IF HA$="CMBDWBCR" THEN BH=79:SH=7
10310 IF HA$="CMBLWBSS" THEN BH=76:SH=67
10320 IF HA$="CMBDWBSS" THEN BH=76:SH=68
10330 IF HA$="CMBLWBME" THEN BH=77:SH=69
10340 IF HA$="CMBDWBME" THEN BH=77:SH=70
10350 IF HA$="CMBLWBLL" THEN BH=78:SH=71
10360 IF HA$="CMBDWBLL" THEN BH=78:SH=72
10370 IF HA$="CMBLFZBD" THEN BH=79:SH=7
10380 IF HA$="CMBDFZBD" THEN BH=79:SH=7
10390 IF HA$="CMBLFZBG" THEN BH=79:SH=7
10400 IF HA$="CMBDFZBG" THEN BH=79:SH=7
10410 IF HA$="CMBLFZCR" THEN BH=79:SH=7
10420 IF HA$="CMBDFZCR" THEN BH=79:SH=7
10430 IF HA$="CMBLFZSS" THEN BH=79:SH=7
10440 IF HA$="CMBDFZSS" THEN BH=79:SH=7
10450 IF HA$="CMBLFZME" THEN BH=80:SH=10
10460 IF HA$="CMBDFZME" THEN BH=80:SH=10
10470 IF HA$="CMBLFZLL" THEN BH=81:SH=12
10480 IF HA$="CMBDFZLL" THEN BH=81:SH=12
10490 IF HA$="CMBLWVBD" THEN BH=76:SH=7
10500 IF HA$="CMBDWVBD" THEN BH=76:SH=7
10510 IF HA$="CMBLWVBG" THEN BH=76:SH=7
10520 IF HA$="CMBDWVBG" THEN BH=76:SH=7
10530 IF HA$="CMBLWVCR" THEN BH=79:SH=7
10540 IF HA$="CMBDWVCR" THEN BH=79:SH=7
10550 IF HA$="CMBLWVSS" THEN BH=76:SH=67
10560 IF HA$="CMBDWVSS" THEN BH=76:SH=68
10570 IF HA$="CMBLWVME" THEN BH=77:SH=69
10580 IF HA$="CMBDWVME" THEN BH=77:SH=70
10590 IF HA$="CMBLWVLL" THEN BH=78:SH=71
10600 IF HA$="CMBDWVLL" THEN BH=78:SH=72
10610 IF HA$="CMBLCYBD" THEN BH=79:SH=7
10620 IF HA$="CMBDCYBD" THEN BH=79:SH=7
10630 IF HA$="CMBLCYBG" THEN BH=79:SH=7
10640 IF HA$="CMBDCYBG" THEN BH=79:SH=7
10650 IF HA$="CMBLCYCR" THEN BH=79:SH=7
10660 IF HA$="CMBDCYCR" THEN BH=79:SH=7
10670 IF HA$="CMBLCYSS" THEN BH=79:SH=7
10680 IF HA$="CMBDCYSS" THEN BH=79:SH=7
10690 IF HA$="CMBLCYME" THEN BH=80:SH=10
10700 IF HA$="CMBDCYME" THEN BH=80:SH=10
10710 IF HA$="CMBLCYLL" THEN BH=81:SH=12
10720 IF HA$="CMBDCYLL" THEN BH=81:SH=12
10730 IF HA$="CMBLAFBD" THEN BH=12:SH=12
10740 IF HA$="CMBDAFBD" THEN BH=12:SH=12
10750 IF HA$="CMBLAFBG" THEN BH=12:SH=12
10760 IF HA$="CMBDAFBG" THEN BH=12:SH=12
10770 IF HA$="CMBLAFCR" THEN BH=12:SH=12
10780 IF HA$="CMBDAFCR" THEN BH=12:SH=12
10790 IF HA$="CMBLAFSS" THEN BH=12:SH=12
10800 IF HA$="CMBDAFSS" THEN BH=12:SH=12
```

```
10810 IF HA$="CMBLAFME" THEN BH=12:SH=12
10820 IF HA$="CMBDAFME" THEN BH=12:SH=12
10830 IF HA$="CMBLAFLL" THEN BH=12:SH=12
10840 IF HA$="CMBDAFLL" THEN BH=12:SH=12
10850 IF HA$="AFBLSTBD" THEN BH=90:SH=86
10860 IF HA$="AFBDSTBD" THEN BH=90:SH=86
10870 IF HA$="AFBLSTBG" THEN BH=104:SH=87
10880 IF HA$="AFBDSTBG" THEN BH=105:SH=88
10890 IF HA$="AFBLSTCR" THEN BH=106:SH=79
10900 IF HA$="AFBDSTCR" THEN BH=89:SH=79
10910 IF HA$="AFBLSTSS" THEN BH=31:SH=31
10920 IF HA$="AFBDSTSS" THEN BH=32:SH=32
10930 IF HA$="AFBLSTME" THEN BH=33:SH=33
10940 IF HA$="AFBDSTME" THEN BH=34:SH=34
10950 IF HA$="AFBLSTLL" THEN BH=35:SH=35
10960 IF HA$="AFBDSTLL" THEN BH=36:SH=36
10970 IF HA$="AFBLWBBD" THEN BH=90:SH=86
10980 IF HA$="AFBDWBBD" THEN BH=90:SH=86
10990 IF HA$="AFBLWBBG" THEN BH=113:SH=95
11000 IF HA$="AFBDWBBG" THEN BH=114:SH=96
11010 IF HA$="AFBLWBCR" THEN BH=106:SH=79
11020 IF HA$="AFBDWBCR" THEN BH=89:SH=79
11030 IF HA$="AFBLWBSS" THEN BH=37:SH=37
11040 IF HA$="AFBDWBSS" THEN BH=38:SH=38
11050 IF HA$="AFBLWBME" THEN BH=39:SH=39
11060 IF HA$="AFBDWBME" THEN BH=40:SH=40
11070 IF HA$="AFBLWBLL" THEN BH=41:SH=41
11080 IF HA$="AFBDWBLL" THEN BH=42:SH=42
11090 IF HA$="AFBLFZBD" THEN BH=90:SH=86
11100 IF HA$="AFBDFZBD" THEN BH=90:SH=86
11110 IF HA$="AFBLFZBG" THEN BH=113:SH=103
11120 IF HA$="AFBDFZBG" THEN BH=114:SH=104
11130 IF HA$="AFBLFZCR" THEN BH=106:SH=79
11140 IF HA$="AFBDFZCR" THEN BH=89:SH=79
11150 IF HA$="AFBLFZSS" THEN BH=8:SH=8
11160 IF HA$="AFBDFZSS" THEN BH=7:SH=7
11170 IF HA$="AFBLFZME" THEN BH=9:SH=9
11180 IF HA$="AFBDFZME" THEN BH=10:SH=10
11190 IF HA$="AFBLFZLL" THEN BH=11:SH=11
11200 IF HA$="AFBDFZLL" THEN BH=12:SH=12
11210 IF HA$="AFBLWVBD" THEN BH=90:SH=86
11220 IF HA$="AFBDWVBD" THEN BH=90:SH=86
11230 IF HA$="AFBLWVBG" THEN BH=113:SH=95
11240 IF HA$="AFBDWVBG" THEN BH=114:SH=96
11250 IF HA$="AFBLWVCR" THEN BH=106:SH=79
11260 IF HA$="AFBDWVCR" THEN BH=89:SH=79
11270 IF HA$="AFBLWVSS" THEN BH=37:SH=37
11280 IF HA$="AFBDWVSS" THEN BH=38:SH=38
11290 IF HA$="AFBLWVME" THEN BH=39:SH=39
11300 IF HA$="AFBDWVME" THEN BH=40:SH=40
11310 IF HA$="AFBLWVLL" THEN BH=41:SH=41
11320 IF HA$="AFBDWVLL" THEN BH=42:SH=42
11330 IF HA$="AFBLCYBD" THEN BH=90:SH=86
11340 IF HA$="AFBDCYBD" THEN BH=90:SH=86
11350 IF HA$="AFBLCYBG" THEN BH=121:SH=103
11360 IF HA$="AFBDCYBG" THEN BH=122:SH=104
11370 IF HA$="AFBLCYCR" THEN BH=106:SH=79
11380 IF HA$="AFBDCYCR" THEN BH=89:SH=79
11390 IF HA$="AFBLCYSS" THEN BH=8:SH=8
11400 IF HA$="AFBDCYSS" THEN BH=7:SH=7
11410 IF HA$="AFBLCYME" THEN BH=9:SH=9
11420 IF HA$="AFBDCYME" THEN BH=10:SH=10
11430 IF HA$="AFBLCYLL" THEN BH=11:SH=11
11440 IF HA$="AFBDCYLL" THEN BH=12:SH=12
11450 IF HA$="AFBLAFBD" THEN BH=11:SH=11
11460 IF HA$="AFBDAFBD" THEN BH=12:SH=12
11470 IF HA$="AFBLAFBG" THEN BH=11:SH=11
11480 IF HA$="AFBDAFBG" THEN BH=12:SH=12
11490 IF HA$="AFBLAFCR" THEN BH=11:SH=11
11500 IF HA$="AFBDAFCR" THEN BH=12:SH=12
11510 IF HA$="AFBLAFSS" THEN BH=11:SH=11
```

```
11520 IF HA$="AFBDAFSS" THEN BH=12:SH=12
11530 IF HA$="AFBLAFME" THEN BH=11:SH=11
11540 IF HA$="AFBDAFME" THEN BH=12:SH=12
11550 IF HA$="AFBLAFLL" THEN BH=11:SH=11
11560 IF HA$="AFBDAFLL" THEN BH=12:SH=12
11570 IF HA$="AMBLSTBD" THEN BH=103:SH=86
11580 IF HA$="AMBDSTBD" THEN BH=103:SH=86
11590 IF HA$="AMBLSTBG" THEN BH=104:SH=87
11600 IF HA$="AMBDSTBG" THEN BH=105:SH=88
11610 IF HA$="AMBLSTCR" THEN BH=106:SH=79
11620 IF HA$="AMBDSTCR" THEN BH=89:SH=79
11630 IF HA$="AMBLSTSS" THEN BH=107:SH=89
11640 IF HA$="AMBDSTSS" THEN BH=108:SH=90
11650 IF HA$="AMBLSTME" THEN BH=109:SH=91
11660 IF HA$="AMBDSTME" THEN BH=110:SH=92
11670 IF HA$="AMBLSTLL" THEN BH=111:SH=93
11680 IF HA$="AMBDSTLL" THEN BH=112:SH=94
11690 IF HA$="AMBLWBBD" THEN BH=103:SH=86
11700 IF HA$="AMBDWBBD" THEN BH=103:SH=86
11710 IF HA$="AMBLWBBG" THEN BH=113:SH=95
11720 IF HA$="AMBDWBBG" THEN BH=114:SH=96
11730 IF HA$="AMBLWBCR" THEN BH=106:SH=79
11740 IF HA$="AMBDWBCR" THEN BH=89:SH=79
11750 IF HA$="AMBLWBSS" THEN BH=115:SH=97
11760 IF HA$="AMBDWBSS" THEN BH=116:SH=98
11770 IF HA$="AMBLWBME" THEN BH=117:SH=99
11780 IF HA$="AMBDWBME" THEN BH=118:SH=100
11790 IF HA$="AMBLWBLL" THEN BH=119:SH=101
11800 IF HA$="AMBDWBLL" THEN BH=120:SH=102
11810 IF HA$="AMBLFZBD" THEN BH=103:SH=86
11820 IF HA$="AMBDFZBD" THEN BH=103:SH=86
11830 IF HA$="AMBLFZBG" THEN BH=121:SH=103
11840 IF HA$="AMBDFZBG" THEN BH=122:SH=104
11850 IF HA$="AMBLFZCR" THEN BH=106:SH=79
11860 IF HA$="AMBDFZCR" THEN BH=89:SH=79
11870 IF HA$="AMBLFZSS" THEN BH=123:SH=8
11880 IF HA$="AMBDFZSS" THEN BH=124:SH=7
11890 IF HA$="AMBLFZME" THEN BH=125:SH=9
11900 IF HA$="AMBDFZME" THEN BH=126:SH=10
11910 IF HA$="AMBLFZLL" THEN BH=11:SH=11
11920 IF HA$="AMBDFZLL" THEN BH=12:SH=12
11930 IF HA$="AMBLWVBD" THEN BH=103:SH=86
11940 IF HA$="AMBDWVBD" THEN BH=103:SH=86
11950 IF HA$="AMBLWVBG" THEN BH=113:SH=95
11960 IF HA$="AMBDWVBG" THEN BH=114:SH=96
11970 IF HA$="AMBLWVCR" THEN BH=106:SH=79
11980 IF HA$="AMBDWVCR" THEN BH=89:SH=79
11990 IF HA$="AMBLWVSS" THEN BH=115:SH=97
12000 IF HA$="AMBDWVSS" THEN BH=116:SH=98
12010 IF HA$="AMBLWVME" THEN BH=117:SH=99
12020 IF HA$="AMBDWVME" THEN BH=118:SH=100
12030 IF HA$="AMBLWVLL" THEN BH=119:SH=101
12040 IF HA$="AMBDWVLL" THEN BH=120:SH=102
12050 IF HA$="AMBLCYBD" THEN BH=103:SH=86
12060 IF HA$="AMBDCYBD" THEN BH=103:SH=86
12070 IF HA$="AMBLCYBG" THEN BH=121:SH=103
12080 IF HA$="AMBDCYBG" THEN BH=122:SH=104
12090 IF HA$="AMBLCYCR" THEN BH=106:SH=79
12100 IF HA$="AMBDCYCR" THEN BH=89:SH=79
12110 IF HA$="AMBLCYSS" THEN BH=123:SH=8
12120 IF HA$="AMBDCYSS" THEN BH=124:SH=7
12130 IF HA$="AMBLCYME" THEN BH=125:SH=9
12140 IF HA$="AMBDCYME" THEN BH=126:SH=10
12150 IF HA$="AMBLCYLL" THEN BH=11:SH=11
12160 IF HA$="AMBDCYLL" THEN BH=12:SH=12
12170 IF HA$="AMBLAFBD" THEN BH=11:SH=11
12180 IF HA$="AMBDAFBD" THEN BH=12:SH=12
12190 IF HA$="AMBLAFBG" THEN BH=11:SH=11
12200 IF HA$="AMBDAFBG" THEN BH=12:SH=12
12210 IF HA$="AMBLAFCR" THEN BH=11:SH=11
12220 IF HA$="AMBDAFCR" THEN BH=12:SH=12
```

```
12230 IF HA$="AMBLAFSS" THEN BH=11:SH=11
12240 IF HA$="AMBDAFSS" THEN BH=12:SH=12
12250 IF HA$="AMBLAFME" THEN BH=11:SH=11
12260 IF HA$="AMBDAFME" THEN BH=12:SH=12
12270 IF HA$="AMBLAFLL" THEN BH=11:SH=11
12280 IF HA$="AMBDAFLL" THEN BH=12:SH=12
12290 COMMON D(),A$,B$,C$,D$,E$,F$,G$,H$,I$,J$
12300 COMMON SP1$,SP2$,SC1$,NO$,FA$,PG,BG,SG,PE,BE,SE,PB,BB,SB
12310 COMMON EY$,HA$,BE$,GL$,NA$,NAM$,PN,BN,SN,PF,BF,SF
12320 COMMON SIGN$,S,T$(),PF$(),BF$(),SF$(),SH,BH,G,H
12330 CHAIN"SEAN5"
12340 REM    THIS IS PROGRAM  "SEAN5" CHAINED FROM
12350 REM    PROGRAM  "SEAN4"
12360 Z$="PEE":ZZ$=STR$(PE):PF$(1)="   "+ZZ$:MID$(PF$(1),1,3)=Z$
12370 Z$="PNN":ZZ$=STR$(PN):PF$(2)="   "+ZZ$:MID$(PF$(2),1,3)=Z$
12380 Z$="PFF":ZZ$=STR$(PF):PF$(3)="   "+ZZ$:MID$(PF$(3),1,3)=Z$
12390 Z$="PBB":ZZ$=STR$(PB):PF$(4)="   "+ZZ$:MID$(PF$(4),1,3)=Z$
12400 Z$="PGG":ZZ$=STR$(PG):PF$(5)="   "+ZZ$:MID$(PF$(5),1,3)=Z$
12410 REM
12420 Z$="BHH":ZZ$=STR$(BH):BF$(1)="   "+ZZ$:MID$(BF$(1),1,3)=Z$
12430 Z$="BEE":ZZ$=STR$(BE):BF$(2)="   "+ZZ$:MID$(BF$(2),1,3)=Z$
12440 Z$="BNN":ZZ$=STR$(BN):BF$(3)="   "+ZZ$:MID$(BF$(3),1,3)=Z$
12450 Z$="BFF":ZZ$=STR$(BF):BF$(4)="   "+ZZ$:MID$(BF$(4),1,3)=Z$
12460 Z$="BBB":ZZ$=STR$(BB):BF$(5)="   "+ZZ$:MID$(BF$(5),1,3)=Z$
12470 Z$="BGG":ZZ$=STR$(BG):BF$(6)="   "+ZZ$:MID$(BF$(6),1,3)=Z$
12480 REM
12490 IF SP=13 THEN SF$(1)="":GOTO 12520
12500 Z$="SHH":ZZ$=STR$(SH):SF$(1)="   "+ZZ$:MID$(SF$(1),1,3)=Z$
12510 IF G=1 THEN 12530
12520 Z$="SEE":ZZ$=STR$(SE):SF$(2)="   "+ZZ$:MID$(SF$(2),1,3)=Z$
12530 Z$="SNN":ZZ$=STR$(SN):SF$(3)="   "+ZZ$:MID$(SF$(3),1,3)=Z$
12540 Z$="SFF":ZZ$=STR$(SF):SF$(4)="   "+ZZ$:MID$(SF$(4),1,3)=Z$
12550 Z$="SBB":ZZ$=STR$(SB):SF$(6)="   "+ZZ$:MID$(SF$(6),1,3)=Z$
12560 Z$="SGG":ZZ$=STR$(SG):SF$(7)="   "+ZZ$:MID$(SF$(7),1,3)=Z$
12570 IF I$="Y" THEN PF$(1)=""
12580 DEFINT I
12590 LPRINT T$(19):LPRINT T$(17):LPRINT T$(18)
12600 LPRINT T$(14):LPRINT T$(15):LPRINT T$(16)
12610 DIM PX(15),PY(15),R(15),FIN$(15)
12620 FOR I=1 TO 10:READ Z(I),ZZ(I):NEXT I
12630 FOR I=1 TO 9:READ W(I),WW(I):NEXT I
12660 LPRINT ";: H A"
12670 FIN$(1)="STAR"
12680 ON LEN(NAM$) GOSUB 12730,12830,12960,13100,13250,13410,13610,13410,13610,13610
12690 GOTO 14160
12700 REM 1 LETTER NAMES
12710 FOR II=1 TO 4
12720 GOSUB 13820
12730 PX(1)=Z(2):PY(1)=ZZ(2):R(2)=0
12740 PX(2)=Z(5):PY(2)=ZZ(5):R(5)=19:FIN$(2)=MID$(NAM$,1,1)
12750 PX(3)=Z(6):PY(3)=ZZ(6):R(6)=18:FIN$(3)="PLURAL"
12760 PX(4)=Z(9):PY(4)=ZZ(9):R(9)=341:FIN$(4)="STAR"
12770 FOR I=1 TO 4
12780 GOSUB 13840
12790 NEXT I
12800 NEXT II
12810 RETURN
12820 REM 2 LETTER NAME
12830 FOR II=1 TO 4
12840 GOSUB 13820
12850 PX(1)=W(2):PY(1)=WW(2):R(2)=0
12860 PX(2)=W(4):PY(2)=WW(4):R(4)=19:FIN$(2)=MID$(NAM$,1,1)
12870 PX(3)=W(5):PY(3)=WW(5):R(5)=19:FIN$(3)=MID$(NAM$,2,1)
12880 PX(4)=W(6):PY(4)=WW(6):R(6)=18:FIN$(4)="PLURAL"
12890 PX(5)=W(8):PY(5)=WW(8):R(8)=351:FIN$(5)="STAR"
12900 FOR I=1 TO 5
12910 GOSUB 13840
```

```
12920 NEXT I
12930 NEXT II
12940 RETURN
12950 REM 3 LETTER NAMES
12960 FOR II=1 TO 4
12970 GOSUB 13820
12980 PX(1)=Z(2):PY(1)=ZZ(2):R(2)=0
12990 PX(2)=Z(4):PY(2)=ZZ(4):R(4)=19:FIN$(2)=MID$(NAM$,1,1)
13000 PX(3)=Z(5):PY(3)=ZZ(5):R(5)=19:FIN$(3)=MID$(NAM$,2,1)
13010 PX(4)=Z(6):PY(4)=ZZ(6):R(6)=18:FIN$(4)=MID$(NAM$,3,1)
13020 PX(5)=Z(7):PY(5)=ZZ(7):R(7)=10:FIN$(5)="PLURAL"
13030 PX(6)=Z(9):PY(6)=ZZ(9):R(9)=341:FIN$(6)="STAR"
13040 FOR I=1 TO 6
13050 GOSUB 13840
13060 NEXT I
13070 NEXT II
13080 RETURN
13090 REM 4 LETTER NAMES
13100 FOR II=1 TO 4
13110 GOSUB 13820
13120 PX(1)=W(1):PY(1)=WW(1):R(1)=355
13130 PX(2)=W(3):PY(2)=WW(3):R(2)=16:FIN$(2)=MID$(NAM$,1,1)
13140 PX(3)=W(4):PY(3)=WW(4):R(3)=18:FIN$(3)=MID$(NAM$,2,1)
13150 PX(4)=W(5):PY(4)=WW(5):R(4)=17:FIN$(4)=MID$(NAM$,3,1)
13160 PX(5)=W(6):PY(5)=WW(6):R(5)=16:FIN$(5)=MID$(NAM$,4,1)
13170 PX(6)=W(7):PY(6)=WW(7):R(6)=6:FIN$(6)="PLURAL"
13180 PX(7)=W(9):PY(7)=WW(9):R(7)=339:FIN$(7)="STAR"
13190 FOR I=1 TO 7
13200 GOSUB 13840
13210 NEXT I
13220 NEXT II
13230 RETURN
13240 REM 5 LETTER NAMES
13250 FOR II=1 TO 4
13260 GOSUB 13820
13270 PX(1)=Z(1):PY(1)=ZZ(1):R(1)=356
13280 PX(2)=Z(3):PY(2)=ZZ(3):R(2)=15:FIN$(2)=MID$(NAM$,1,1)
13290 PX(3)=Z(4):PY(3)=ZZ(4):R(3)=19:FIN$(3)=MID$(NAM$,2,1)
13300 PX(4)=Z(5):PY(4)=ZZ(5):R(4)=19:FIN$(4)=MID$(NAM$,3,1)
13310 PX(5)=Z(6):PY(5)=ZZ(6):R(5)=18:FIN$(5)=MID$(NAM$,4,1)
13320 PX(6)=Z(7):PY(6)=ZZ(7):R(6)=10:FIN$(6)=MID$(NAM$,5,1)
13330 PX(7)=Z(8):PY(7)=ZZ(8):R(7)=356:FIN$(7)="PLURAL"
13340 PX(8)=Z(10):PY(8)=ZZ(10):R(8)=329:FIN$(8)="STAR"
13350 FOR I=1 TO 8
13360 GOSUB 13840
13370 NEXT I
13380 NEXT II
13390 RETURN
13400 REM 6 & 8 LETTER NAMES
13410 FOR II=1 TO 4
13420 GOSUB 13820
13430 PX(1)=W(1):PY(1)=WW(1):R(1)=355
13440 PX(2)=W(2):PY(2)=WW(2):R(2)=8
13450 PX(3)=W(3):PY(3)=WW(3):R(3)=16
13460 PX(4)=W(4):PY(4)=WW(4):R(4)=18
13470 PX(5)=W(5):PY(5)=WW(5):R(5)=17
13480 PX(6)=W(6):PY(6)=WW(6):R(6)=16
13490 PX(7)=W(7):PY(7)=WW(7):R(7)=6
13500 PX(8)=W(8):PY(8)=WW(8):R(8)=351
13510 PX(9)=W(9):PY(9)=WW(9):R(9)=339:FIN$(9)="PLURAL"
13520 IF LEN(NAM$)=8 THEN 13540
13530 FOR I=2 TO 7:FIN$(I)=MID$(NAM$,I-1,1):NEXT I:FIN$(8)="PLURAL":FIN$(9)="STAR":GOTO 13550
13540 FOR I=1 TO 8:FIN$(I)=MID$(NAM$,I,1):NEXT I
13550 FOR I=1 TO 9
13560 GOSUB 13840
13570 NEXT I
13580 NEXT II
13590 RETURN
13600 REM 7 & 9 LETTER NAMES
13610 FOR II=1 TO 4
```

```
13620 GOSUB 13820
13630 PX(1)=Z(1):PY(1)=ZZ(1):R(1)=-9
13640 PX(2)=Z(2):PY(2)=ZZ(2):R(2)=0
13650 PX(3)=Z(3):PY(3)=ZZ(3):R(3)=15
13660 PX(4)=Z(4):PY(4)=ZZ(4):R(4)=19
13670 PX(5)=Z(5):PY(5)=ZZ(5):R(5)=19
13680 PX(6)=Z(6):PY(6)=ZZ(6):R(6)=18
13690 PX(7)=Z(7):PY(7)=ZZ(7):R(7)=10
13700 PX(8)=Z(8):PY(8)=ZZ(8):R(8)=356
13710 PX(9)=Z(9):PY(9)=ZZ(9):R(9)=341
13720 PX(10)=Z(10):PY(10)=ZZ(10):R(10)=329:FIN$(10)="PLURAL"
13730 IF LEN(NAM$)<>7 THEN 13750
13740 FOR I=2 TO 8:FIN$(I)=MID$(NAM$,I-1,1):NEXT I:FIN$(9)="PLURAL":FIN$(10)="ST
AR":GOTO 13770
13750 FOR I=1 TO 9:FIN$(I)=MID$(NAM$,I,1):NEXT I
13760 IF LEN(NAM$)=10 THEN FIN$(10)=MID$(NAM$,10,1)
13770 FOR I=1 TO 10
13780 GOSUB 13840
13790 NEXT I
13800 NEXT II
13810 RETURN
13820 IQ=II+1:IF IQ=5 THEN IQ=1
13830 LPRINT "U";A$="P":AA$=STR$(IQ):MID$(AA$,1,1-1+1)=A$:LPRINT AA$:RETURN
13840 A$=STR$(IQ):AA$=MID$(A$,2,1):A$=FIN$(I)+AA$
13850 FI$="C:"+A$
13860 OPEN "I",#1,FI$
13870 R(I)=R(I)+90:R(I)=R(I)*3.14159/180
13880 C1=COS(R(I)):C2=SIN(R(I)):C3=-SIN(R(I)):C4=COS(R(I))
13890 INPUT#1,X$:NP=VAL(X$)
13900 FOR IC=1 TO NP
13910 INPUT#1,X$:X=VAL(X$):IF X<90 THEN 13930
13920 A=X:INPUT#1,X$:Y=VAL(X$):B=Y:GOSUB 13940:W$=STR$(IX):Y$=STR$(IY):X$=W$+Y$:
IC=IC+1
13930 LPRINT X$:NEXT IC:CLOSE#1:RETURN
13940 IX=A*C1+B*C3:IY=A*C2+B*C4:IX=IX+PY(I):IY=IY+PX(I)+100:RETURN
13950 DATA 0,510
13960 DATA 175,570
13970 DATA 400,620
13980 DATA 560,595
13990 DATA 680,550
14000 DATA 800,500
14010 DATA 880,435
14020 DATA 950,365
14030 DATA 1030,305
14040 DATA 1130,285
14050 REM
14060 DATA 100,525
14070 DATA 305,580
14080 DATA 486,576
14090 DATA 614,545
14100 DATA 730,510
14110 DATA 840,471
14120 DATA 910,400
14130 DATA 980,321
14140 DATA 1060,280
14150 REM HAIR
14160 IF H=1 THEN GOTO 14350: REM  SPORT HAS A CAP OR HAT DO NOT DRAW TOP OF HA
IR
14170 FOR TM=1 TO 116 : REM NUMBER OF HAIR TYPES
14180 READ H1
14190 IF SF=TM THEN 14220
14200 NEXT TM
14210 GOTO 14350
14220 FOR I=8 TO 1 STEP -1
14230 SF$(I+1)=SF$(I)
14240 NEXT I
14250 SF$(1)="SHH"+STR$(H1)+"H"
14260 GOTO 14350
14270 REM   THE FILES VALUES OF SHORT HAIR
14280 DATA 1,1,1,4,4,4,7,8,9,10,11,12,13,14,13,14,13,14,19,20,19,20,19,2
14290 DATA 25,26,25,26,25,26,31,32,31,32,31,32,37,38,37,38,37,38
```

```
14300 DATA 43,44,43,44,43,44,49,50,49,50,49,50,55,56,55,56,55,56
14310 DATA 61,62,61,62,61,62,67,68,67,68,67,68,73,74,73,74,73,74
14320 DATA 79,80,81,80,81,80,81,86,87,88,89,90,89,90,89,90
14330 DATA 95,96,97,98,97,98,97,98,103,104,105,106,105,106,105,106
14340 DATA 111,112,111,112,111,112
14350 REM  PORPLOT.BAS
14360 REM           PROFILE PLOT
14370 LPRINT "U P5"
14380 LPRINT T$(1):LPRINT "INNER":LPRINT NA$:LPRINT CHR$(95)
14390 LPRINT "U P8"
14400 LPRINT T$(2)
14410 LPRINT CHR$(95)
14420 REM PLOT  SPORTS NAME 2 LINES IN PROFILE
14430 LPRINT T$(19):LPRINT T$(20)
14440 LPRINT "U P5"
14450 FOR I=1 TO 8
14460 PRINT PF$(I)
14470 IF PF$(I)="" THEN 14560
14480 PF$="C:"+PF$(I)
14490 OPEN "I",#1,PF$
14500 INPUT #1, NP
14510 FOR J=1 TO NP
14520 INPUT #1, C$
14530 LPRINT C$
14540 NEXT J
14550 CLOSE#1
14560 NEXT I
14570 REM           BANKNOTE PLOT
14580 LPRINT "U P1"
14590 FOR I=1 TO 7
14600 IF BF$(I)="" THEN 14690
14610 BF$="C:"+BF$(I)
14620 OPEN "I",#1,BF$
14630 INPUT #1,NP
14640 FOR J=1 TO NP
14650 INPUT #1, C$
14660 LPRINT C$
14670 NEXT J
14680 CLOSE #1
14690 NEXT I
14700 LPRINT "U P6"
14710 LPRINT T$(3)
14720 REM CHANGE TO SMALL PEN
14730 LPRINT "U P8"
14740 LPRINT T$(4)
14750 LPRINT T$(5)
14760 LPRINT T$(6)
14770 REM CHANGE TO BIG PEN
14780 LPRINT "U P2"
14790 LPRINT T$(7)
14800 LPRINT T$(8)
14810 REM CHANGE TO SMALL PEN
14820 LPRINT "U P8"
14830 REM PLOT VARIABLE NAMES
14840 IF T$(11)="" THEN 14860
14850 LPRINT T$(11)
14860 IF T$(12)="" THEN 14890
14870 LPRINT T$(12)
14880 REM CHANGE TO BIG PEN
14890 LPRINT "U P3"
14900 LPRINT T$(9)
14910 LPRINT T$(10)
14920 LPRINT "U P2"
14930 IF G=1 THEN SF$(7)=""
14940 REM    SPORT PLOT
14950 FOR I=0 TO 9
14960 IF SF$(I)="" THEN 15050
14970 SF$="C:"+SF$(I)
14980 OPEN "I",#1,SF$
14990 INPUT #1,NP
```

```
15000 FOR J=1 TO NP
15010 INPUT #1, C$
15020 LPRINT C$
15030 NEXT J
15040 CLOSE #1
15050 NEXT I
15060 TX$=NA$+" THE"
15070 YO=1440+((INT((17-LEN(TX$))/2))*18)
15080 NX=3040:INX=18
15090 FOR I=1 TO LEN(TX$)
15100 YO=YO+INX
15110 FI$=MID$(TX$,I,1)
15120 IF FI$=" " THEN 15230
15130 FX$="C:"+FI$
15140 OPEN "I",#1,FX$
15150 INPUT#1,X$:NP=VAL(X$)
15160 FOR II=1 TO NP
15170 INPUT#1,X$
15180 X=VAL(X$):IF X>90 THEN INPUT#1,Y$:II=II+1:Y=VAL(Y$):Y=Y+YO:XX$=X$+STR$(Y)
15190 LPRINT XX$
15200 NEXT II
15210 LPRINT "U"
15220 CLOSE#1
15230 NEXT I
15240 YO=1440+((INT((17-LEN(SC1$))/2))*18)
15250 NX=2990:INX=18
15260 FOR I=1 TO LEN(SC1$)
15270 YO=YO+INX
15280 FI$=MID$(SC1$,I,1)
15290 IF FI$=" " THEN 15400
15300 FX$="C:"+FI$
15310 OPEN "I",#1,FX$
15320 INPUT#1,X$:NP=VAL(X$)
15330 FOR II=1 TO NP
15340 INPUT#1,X$
15350 X=VAL(X$):IF X>90 THEN INPUT#1,Y$:II=II+1:Y=VAL(Y$):Y=Y+YO:XX$=X$+STR$(Y)
15360 LPRINT XX$
15370 NEXT II
15380 LPRINT "U"
15390 CLOSE#1
15400 NEXT I:NE=1
15410 COMMON NE
15420 CHAIN"HUMOR"
```

We claim:

1. An apparatus for producing a personalized drawing of a user within preprinted background material comprising:
   a means for recording a plurality of factors affecting the user's appearance;
   a means for selecting at least two predesigned visual features most fitting to the user from a plurality of predesigned visual features in accordance with the plurality of factors affecting the user's appearance;
   a means for automatically controlling a plotter to draw the at least two predesigned visual features most fitting to the user within the preprinted background material to produce a continuous and personalized drawing of the user.

2. The apparatus in accordance with claim 1 in which the at least two visual features most fitting to the user comprise the user's nose, hair style, eye, chin and ear.

3. The apparatus in accordance with claim 2 in which the plurality of factors affecting the user's appearance comprise the following factors:
   the user's age;
   the user's sex;
   the user's race;
   the length of user's hair;
   the color of user's hair;
   the user's hair type;
   whether the user has facial hair;
   the configuration of the user's facial hair;
   whether the user wears glasses; and,
   the user's build.

4. The apparatus in accordance with claim 3 in which the personalized drawing of the user comprises a profile.

5. The apparatus in accordance with claim 1 further including:
   a means for recording a favorite pastime of the user;
   a means for selecting a predesigned action background material in accordance with the recorded favorite pastime of the user; and,
   a means for automatically controlling the plotter to draw the selected predesigned action background material and incorporating the at least two visual features most fitting to the user within the selected predesigned action background material to produce a continuous and personalized drawing of the user acting out his/her favorite pastime.

6. Apparatus in accordance with claim 1 including means for recording personal information; and
   means for controlling the plotter to print personalized information among preprinted background.

7. Apparatus in accordance with claim 6 including means for storing textual material related to various age group, sex and pastimes;

selecting appropriate personalized textual material based upon at least one of the following factors; age, sex, and pastime; and means for directing said plotter to print said textual material.

8. A method of producing a personalized drawing of a user within preprinted background material comprising the steps of:

recording a plurality of factors affecting the user's appearance;

selecting at least two predesigned visual features most fitting to the user from a plurality of predesigned visual features in accordance with the plurality factors affecting the user's appearance;

automatically controlling a plotter to draw the at least two predesigned visual features most fitting to the user within the preprinted background material to produce a continuous and personalized drawing of the user.

9. The method in accordance with claim 8 in which the at least two visual features most fitting to the user comprise the user's nose, hair style, eye, chin and ear.

10. The method in accordance with claim 9 in which the plurality of factors affecting the user's appearance comprise the following factors:

the user's age;
    the user's sex;
    the user's race;
    the length of the user's hair;
    the color of the user's hair;
    the user's hair type;
    whether the user has facial hair;
    the size of the user's nose;
    whether the user wears glasses; and,
    the user's build.

11. The method in accordance with claim 10 in which the personalized drawing of the user comprises a profile.

12. The method in accordance with claim 8 further including the steps of:

recording a favorite pastime of the user;

selecting a predesigned action background material in accordance with the recorded favorite pastime of the user; and, automatically controlling the plotter to draw the selected predesigned action background material and incorporating the at least two visual features most fitting to the user within the selected predesigned action background material to produce a continuous and personalized drawing of the user acting out his/her favorite pastime.

13. The combination in accordance with claim 12 including input means for said computer for introducing physical information with respect to the subject of the personalization and wherein said computer includes means for converting said personalized data into control signals for said impression producing device to produce a pictorial representation bearing a correspondence to the physical data inputted.

14. The combination in accordance with claim 13 where said computer stores a plurality of control signals for producing a variety of different pictorial representations and including means for selecting the control signal corresponding to the physical information introduced into the input means.

15. The combination in accordance with claim 12 wherein said input means includes a card reader for introducing physical information and a keyboard for introducing personalized text material.

16. The combination in accordance with claim 12 wherein said impression producing device comprises a plotter adapted to receive said standardized document for plotting thereon and control signals from said computer for producing the personalized text and pictorial information.

17. Apparatus for producing a personalized pictorial and text document from standardized text material and pictorial background and personal data comprising:

a standardized document including text and pictorial background, each of which include blank portions therein;

computer means for:

(a) storing the locations of the blank positions in said standardized document;

(b) storing selected personalized data introduced into to the computer;

(c) converting the stored selected personalized data into the personalized text and pictorial representations and the intended location thereof;

(d) controlling the movement of an impression producing device for producing the personalized text and pictorial representations on the standardized document in the appropriate locations on the standardized document; and an impression producing device for reproducing on said standardized document, the personalized text and pictorial representations.

18. The combination in accordance with claim 17 wherein said computer means includes means for storing a plurality of control signals for said impression producing device, one control signal for each of a number of stored components of a pictorial representation and one control signal for each variation of each of said stored components depending upon the personalized data introduced into the computer means.

19. The method for producing a personalized pictorial and text presentation comprising the steps of;

storing selected personal information and physical data of a person;

storing pictorial background information to be used in the preparation of the presentation;

storing standardized textual information compatable with the pictorial background information;

converting the stored personal and physical data to a pictorial representation of a person;

combining the standardized textual information with the personal information to provide personalized text information; and reproducing a personalized pictorial rendition against the stored pictorial background accompanied by personalized text.

20. The method in accordance with claim 19 in which the storing of personal information and physical data is done by physically entering the data on a common media.

21. The method in accordance with claim 20 whereby the storing of personal information and physical data is accomplished by making machine readable marks on and by machine reading a card.

22. The method in accordance with claim 19 wherein the step of converting the physical data is accomplished by storing a plurality of pictorial representations of different physical characteristics;

comparing the physical data inputted with the stored pictorial representations; and selecting the matching pictorial representations for reproduction.

23. The method in accordance with claim 19 in which the step of combining personal data and standardized text information comprises the step of inputting the personal data into a computer which stores the standardized text information in the appropriate position in the text; and selecting appropriate gender for the standardized text.

24. The method in accordance with claim 19 in which the step of reproducing the combined pictorial and textual greeting card or poster comprises the step of printing the personalized textual and pictorial information on a standardized background including standardized text and background with the personalized textual information inserted in the blanks in the standardized text and personal pictorial rendition inserted in the blanks in the stored pictorial background.

25. A personalized text and pictorial printed presentation produced by the process of:

storing a plurality of segments of the facial features of various types;

storing a plurality of hair styles;

storing a plurality of clothing styles;

introducing personal data of a person to be characterized into a storage means, said personal data including age, category, sex and race;

introducing personal data of a person including name into a storage means;

selecting facial features, hair style and clothing as a function of the personal data introduced into said storage means;

plotting a combination of facial features, hair style and clothing as selected to produce a pictorial printed presentation of the person; and printing personal data such as the person's name along with the pictorial printed presentation.

26. A personalized text and pictorial printed presentation in accordance with claim 25 wherein said personalized text and pictorial printed presentation is printed on a preprinted background including standardized text whereby said standardized text and personal data such as the person's name constitute meaningful personalized text.

27. A personalized text and pictorial printed presentation in accordance with claim 25 wherein the facial features stored include both front face and profile whereby both a front face and a profile of the person may be presented in the completed personalized text and pictorial printed presentation.

28. A personalized text and pictorial printed presentation in accordance with claim 25 in which the storing and selecting is accomplished by computer means.

* * * * *